United States Patent
Fuller et al.

(10) Patent No.: US 11,980,822 B2
(45) Date of Patent: *May 14, 2024

(54) SENSORIMOTOR ASSESSMENT AND TRAINING

(71) Applicant: STATE SPACE LABS, INC., New York, NY (US)

(72) Inventors: Jason R. Fuller, New York, NY (US); David J. Heeger, New York, NY (US); Wayne E. Mackey, New York, NY (US)

(73) Assignee: STATE SPACE LABS, INC., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/993,349

(22) Filed: Nov. 23, 2022

(65) Prior Publication Data
US 2023/0081279 A1 Mar. 16, 2023

Related U.S. Application Data

(63) Continuation of application No. 17/975,769, filed on Oct. 28, 2022, which is a continuation of application No. 16/121,210, filed on Sep. 4, 2018, now Pat. No. 11,602,697.

(60) Provisional application No. 62/554,212, filed on Sep. 5, 2017.

(51) Int. Cl.
*A63F 13/798* (2014.01)
*A63F 13/67* (2014.01)

(52) U.S. Cl.
CPC ............ *A63F 13/798* (2014.09); *A63F 13/67* (2014.09); *A63F 2300/535* (2013.01)

(58) Field of Classification Search
CPC .............................. A63F 13/67; A63F 13/798
See application file for complete search history.

(56) References Cited

U.S. PATENT DOCUMENTS

| | | | |
|---|---|---|---|
| 9,448,634 | B1 | 9/2016 | Wakeford |
| 9,448,636 | B2 | 9/2016 | Balzacki |
| 10,302,396 | B1 | 5/2019 | Ray |
| 11,458,405 | B1 | 10/2022 | Welch et al. |
| 2002/0025482 | A1 | 2/2002 | Imai |
| 2002/0025842 | A1 | 2/2002 | Nobe et al. |
| 2003/0013528 | A1 | 1/2003 | Allibhoy |

(Continued)

OTHER PUBLICATIONS

Office Action of U.S. Appl. No. 17/975,769, dated May 2, 2023.
(Continued)

*Primary Examiner* — Thomas H Henry
(74) *Attorney, Agent, or Firm* — PEARL COHEN ZEDEK LATZER BARATZ LLP

(57) ABSTRACT

Disclosed herein are system, method, and computer program product embodiments for assessing performance of a player of a game. An embodiment operates by monitoring for an input from the player of the game, receiving the input from the player of the game, and determining a characteristic of the game resulting from the input from the player. Based on the input from the player, a performance of the player is assessed. The performance of the player relating to one or more metrics of the game is monitored, and is assessed by (Continued)

comparing the input from the player during the period of time to an optimal input during the period of time in the game.

21 Claims, 15 Drawing Sheets

(56) References Cited

U.S. PATENT DOCUMENTS

| | | | |
|---|---|---|---|
| 2004/0242321 | A1 | 12/2004 | Overton |
| 2006/0097453 | A1 | 5/2006 | Feldman et al. |
| 2006/0223041 | A1 | 10/2006 | Beck et al. |
| 2007/0163427 | A1 | 7/2007 | Rigopulos |
| 2009/0118010 | A1 | 5/2009 | Ashida |
| 2009/0258703 | A1 | 10/2009 | Brunstetter |
| 2010/0240458 | A1 | 9/2010 | Gaiba et al. |
| 2011/0281639 | A1 | 11/2011 | Porat |
| 2012/0142429 | A1 | 6/2012 | Muller |
| 2013/0072297 | A1* | 3/2013 | Seegers ............... A63F 13/213 463/31 |
| 2013/0128022 | A1 | 5/2013 | Bose |
| 2014/0243077 | A1 | 8/2014 | Choi |
| 2014/0256427 | A1* | 9/2014 | Wolff-Petersen ....... A63F 13/22 463/43 |
| 2015/0238866 | A1 | 8/2015 | Khabazian |
| 2016/0055236 | A1 | 2/2016 | Frank et al. |
| 2016/0262680 | A1 | 9/2016 | Martucci et al. |
| 2016/0267804 | A1 | 9/2016 | Pemba et al. |
| 2017/0086712 | A1 | 3/2017 | Mauro et al. |
| 2017/0087453 | A1 | 3/2017 | Poisner |
| 2017/0087470 | A1 | 3/2017 | Bostick |
| 2017/0287287 | A1 | 10/2017 | Froy et al. |
| 2017/0290504 | A1 | 10/2017 | Khaderi |
| 2018/0095524 | A1 | 4/2018 | Chew |
| 2019/0046836 | A1 | 2/2019 | Starkey |
| 2019/0070512 | A1 | 3/2019 | Fuller et al. |
| 2019/0216392 | A1 | 7/2019 | Bower et al. |
| 2020/0111385 | A1 | 4/2020 | Issa et al. |
| 2020/0289886 | A1 | 9/2020 | Starkey |
| 2022/0198368 | A1 | 6/2022 | May |
| 2023/0052175 | A1 | 2/2023 | Fuller et al. |

OTHER PUBLICATIONS

Office Action of U.S. Appl. No. 18/083,928, dated May 10, 2023.
Office Action of U.S. Appl. No. 18/099,596, dated May 10, 2023.
Office Action for U.S. Appl. No. 18/352,050, dated Sep. 27, 2023.
Final Rejection for U.S. Appl. No. 17/975,769, dated Jul. 27, 2023.
Final Rejection for U.S. Appl. No. 18/038,928, dated Jul. 24, 2023.
Final Rejection for U.S. Appl. No. 18/099,596, dated Jul. 28, 2023.
Arstechnica article: "Cheat-maker brags of computer-vision auto-aim that works on any game", Kyle Orland Jul. 9, 2021, https://arstechnica.com/aaminq/2021/07/cheat-maker-braqs-of-computer.
Ian Donovan et al. "Assessment of Human Expertise and Movement Kinematics in First-Person Shooter Games" Front. Hum. Neurosci., Nov. 29, 2022, Sec. Motor Neuroscience vol. 16—2022.
Boritz, James, Kellogg S. Booth and Wiliam B. Cowan. "Fitts Law Studies of Directional Mouse Movement." 1991.
Fitts, P. M. "The information capacity of the human motor system in controlling the amplitude of movement" *Journal of Experimental Psychology*, 47(6), 381-391, Jun. 1954.
McDougle, S.D., Taylor, J.A. "Dissociable cognitive strategies for sensorimotor learning" Nat Commun 10, 40 (2019).
Muller H, Sternad D. "Decomposition of variability in the execution of goaloriented tasks: three components of skill improvement" J Exp Psychol Hum Percept Perform. Feb. 2004;30(1):212-33. doi: 10.1037/0096-1523.30.1.212. PMID:14769078.
Looser, Julian. "On the Validity of Using First-Person Shooters for Fitts Law Studies." University of Canterbury, (2005).
Shmuelof L, Yang J, Caffo B, Mazzoni P, Krakauer JW. "The neural correlates of learned motor acuity" J Neurophysiol. Aug. 15, 2014;112(4):971-80. doi: 10.1152/jn.00897.2013. Epub May 21, 2014. PMID: 24848466; PMCID: PMC4122746.
Wilterson, S. A. "Implicit Recalibration and Strategic Compensation in Learned and De Novo Motor Skills" (Ph.D. thesis). Princeton University, 2021.
Zhai, S., Kong, J., and Ren, X. "Speed-accuracy tradeoff in fills law tasks—on the equivalency of actual and nominal pointing precision" Int. J. Hum. Comput. Stud. 61, 823-856. 2004, doi: 10.1016/j.ijhcs.
https://aimlab.qg/ printed on May 5, 2023.

\* cited by examiner

SENSORIMOTOR ASSESSMENT AND TRAINING

PRIOR APPLICATION DATA

The present application is a continuation of prior U.S. application Ser. No. 17/975,769, filed on Oct. 28, 2022, entitled "SENSORIMOTOR ASSESSMENT AND TRAINING", which is a continuation of prior US application Ser. No. 16/121,210, filed on Sep. 4, 2018, entitled "SENSORIMOTOR ASSESSMENT AND TRAINING", which in turn claims the benefit of prior U.S. provisional application 62/554,212, each incorporated by reference herein in its entirety.

TECHNICAL FIELD

This disclosure relates generally to assessing and training a player of a video game.

BACKGROUND

Competitive video gaming (eSports) is the fastest growing sport on the planet with an estimated 380 million players globally. The global video game market was $138B in 2018 with 13% year-over-year growth. Professional eSports was $1B in 2017 with 38% year-over-year growth.

eSports players want to wins losing is painful. In traditional "stick and ball" sports, a player can improve their chances of winning by 1) assessing their own abilities and training to improve their performance, and 2) assessing the performance of other players to choose better teammates and to choose strategies that expose their opponents' weaknesses. Unlike traditional sports, there are few metrics in eSports for assessing a player's ability and health, and no training methods for improving a player's performance. Amateur eSports players and individuals in the professional eSports industry agree that assessment and training are critical needs. Burnout is high among many players due to inefficient training. Top players are well aware that they have weaknesses in their game and they spend a lot of time trying to identify them and correct them.

SUMMARY

According to an embodiment, a computer-implemented method for assessing performance of a player of a game is provided. The computer-implemented method comprises: (i) monitoring, by a processor, for an input from the player of the game over a period of time; and (ii) receiving, by the processor, the input from the player of the game during the period of time; (iii) determining, by the processor, a characteristic of the game resulting from the input from the player; and (iv) assessing, by the processor, based on the input from the player during the game, a performance of the player during a period of time in the game, the performance of the player relating to one or more metrics of the game. The performance of the player comprises comparing the input from the player during the period of time in the game to an optimal input from the player during the period of time in the game.

According to another embodiment, a system comprising a memory and processor coupled to the memory is provided. The processor is configured to: (i) monitor an input of a player of a game during a period of time, (ii) monitor the input from the player during the game during the period of time, (iii) determine a characteristic of the game from the input from the player, and (iv) assess, based on the input from the player during the game, a performance of the player during a period of time in the game. The performance of the player relates to one or more metrics of the game, and it comprises comparing the input from the player during the period of time in the game to an optimal input from the player during the period of time in the game.

In some embodiments, a system comprises a computer having a computer program that implements an eSport game that assesses a player's ability (e.g., speed and accuracy), and that trains the player to improve their performance. The computer program presents sensory stimulation (e.g., images on a computer display) that corresponds to a 3D virtual environment. The computer program also receives input signals from an input controller (e.g., mouse and keyboard) to measure the player's movements. The computer program changes the state of the virtual environment based on the input signals, and re-renders the sensory stimulation dynamically over time according to the changes of state of the virtual environment. The computer program, furthermore, evaluates the input signals from the input controller, to assess the player's performance. Finally, the computer program dynamically changes the sensory stimulation and/or the evaluation of the input signals to train the player to improve their performance.

According to yet another embodiment, a tangible computer-readable device having instructions stored thereon is provided. The tangible computer-readable device, when executed by a computing device, causes the computing device to perform operations comprising: (i) monitoring for an input from a player of a game over a period of time; (ii) receiving the input from the player during the game over the period of time; (iii) determining a characteristic of the game resulting from the input from the player; and (iv) assessing, based on the input from the player during the game, a performance of the player. The performance of the player is related to one or more metrics of the game, and it comprises comparing the input from the player during the period of time in the game to an optimal input from the player during the period of time in the game.

In some embodiments, a tangible computer-readable device is provided having instructions stored thereon that, when executed by computing device, permits the computing software platform to provide a first-person shooter eSport game (e.g., "Overwatch"), and to perform operations to assess a player's ability (e.g., speed and accuracy) and train the player to improve their performance.

According to yet another embodiment, a smart input controller is provided that identifies systematic errors in a player's movements and automatically compensates for the errors to improve the player's performance.

A computer-implemented method may include that the determining of the relationship and the manipulation of the outcome of the input of the player are performed by a computer program comprising the game. A computer-implemented method may include that the determining of the relationship and the manipulation of the outcome of the input of the player are performed by a device for playing the game.

The manipulation of the outcome of the input of the player may include manipulating at least one of a position, velocity, acceleration, higher-order temporal derivative of the position, orientation, angular velocity, angular acceleration, higher-order temporal derivative of the orientation, joint angle, angular velocity of the joint angle, angular acceleration of the joint angle, and higher-order temporal derivatives of the joint angle of the input of the player.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
FIG. 1 illustrates a screenshot from a game providing assessment and training of a player, according to some embodiments.

Provided herein are system, method and/or computer program product embodiments, and/or combinations and sub-combinations thereof, for assessing a player's ability in an environment based on their input, and for training the player to improve (and even optimize) their performance in the environment such that they acquire an improved or even optimal input. As used herein, in embodiments, optimal input is input that results in a more or most favorable outcome or performance. For example, an optimal input can be that of an expert. Moreover, some embodiments are directed to a player's ability and/or performance in a gaming environment. The factors that can be assessed include those related to a player's sensorimotor behavior, such as perception, attention, motor control, perceptual learning, motor learning, perceptually-guided decision making, and cognitive control of sensorimotor behavior. However, a person of ordinary skill would readily recognize that this may apply to a wide variety of other applications which depend on sensory behavior, such as rehabilitation, military training, and police training, to name just some examples. The same factors being discussed and assessed in the present application also apply to these applications.

FIGS. 1 to 9 illustrate exemplary games which provide assessment and training capabilities of a player's ability and/or performance. The games can be practice games, or can be real-games. To assess the ability of a player, a number of metrics are monitored. The metrics can depend on the game. The metrics can also be selected by a player and/or a trainer of the game. Exemplary metrics include speed, precision, accuracy, reaction time. The metrics can also relate to one or more characteristics of a player in a game, such as shooting of a weapon, interaction with a ball (e.g., baseball, soccer ball, tennis ball), virtual combat with another player.

The game can include several different scenarios for target practice. In a first scenario, the "Spidershot Accuracy" scenario, a player can shoot at one or more targets presented at random locations in a virtual environment. Targets can be visible for a fixed period of time, and the player's goal can be to accurately eliminate all targets that appear. This scenario measures accuracy orienting to targets at different locations. A second scenario, the "Spidershot Speed" scenario, is similar to the Spidershot Accuracy scenario but the target presentation durations are varied to measure the speed with which the player orients to different locations. Targets are presented, one at a time, at various locations in a 3D virtual environment. Each target is presented for a limited period of time. The player's goal is to shoot each target before it disappears. The presentation time of each target is dynamically adjusted based on the player's performance at that location, to train the player to improve their performance. When the player hits a target, the next target at that same location is presented for a shorter period of time. When a target is missed, the next target at that same location is presented for a longer period of time. In a third scenario, the "Reflexshot" scenario, one or more targets are presented at random locations and at random intervals. The player's goal is to quickly and accurately eliminate as many targets as possible before a time limit is reached. In a fourth scenario, the "Headshot" scenario, targets are again presented at random locations. The player receives points for accurate headshots, and loses points proportional to the distance from an accurate headshot (e.g., the greater the distance, the greater the loss of points). In a fifth scenario, the "Cornershot/Pentakill" scenario, the player is positioned near the end of a wall. A plurality of enemies appear through an entrance in the wall and travel across the virtual environment to a destination. The player must eliminate all enemies before they reach their destination. This scenario measures accuracy for multiple moving targets, and for both left corner and right corner positions. This is a common strategic position in first person shooter (FPS) games. A player will camp the exit of an area to quickly eliminate enemies as they pass from the exit into the next cover area. Speed and accuracy is critical because the player has the element of surprise initially. After the first shot, the enemy knows where they are. In a sixth scenario, the "Strafeshot" scenario, a single target strafes unpredictably. The goal of the player is to hit the moving target as many times as possible in a limited amount of time. Additional modes include movement techniques unique to particular characters in popular eSports (e.g., Genji's double jump, Tracer's blink teleportation, and Pharah's rocket boost/hover combo). Strafeshot accuracy is critical because: (1) rarely are players shooting at still enemies and (2) upon engagement, most enemies strafe as a defensive tactic. In a seventh scenario, the "Freeplay" scenario, a player is dropped into a typical FPS map with artificial intelligence (AI) enemies that shoot back. The player's goal is to survive as long as possible and eliminate as many enemies as possible. This scenario measures a number of skills and biases that impact the player's performance, including accuracy while moving, accuracy while being attacked, movement and positioning biases, and general gameplay biases.

FIG. 1 shows a screenshot of an exemplary scenario of the game. In this scenario, targets are presented at each of 8 locations. For each target location, targets are presented for 3 different durations and 2 different sizes. For each target location, duration, and size, there are a plurality of repeated trials. The different target locations, durations, and sizes are presented randomly and shuffled in-order. Movements are sampled at 60 Hz in this example, although other sampling rates could be used.

Figure 2:
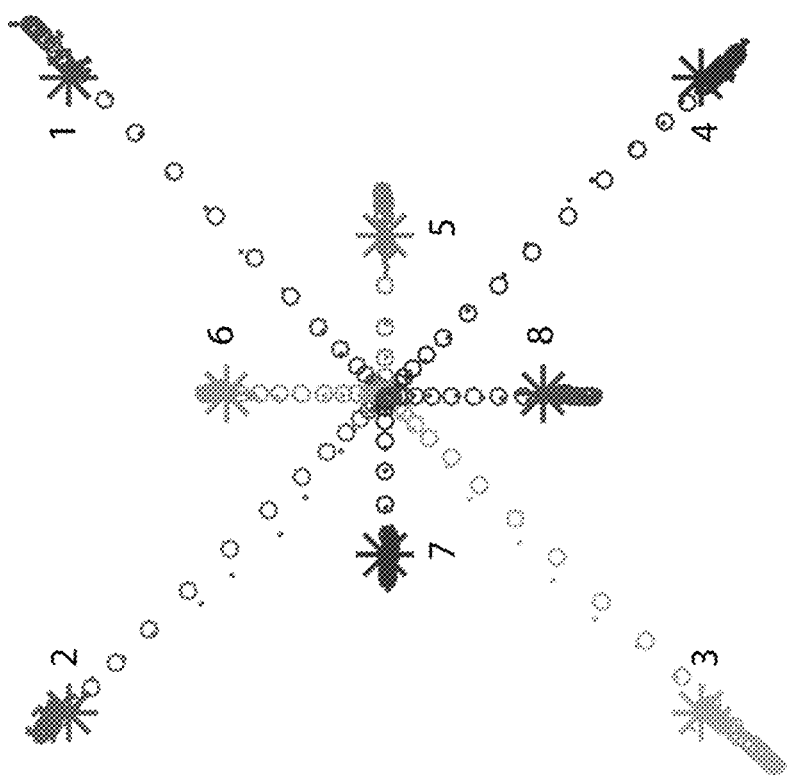
FIG. 2 illustrates exemplary trajectories of movement of a player in the game of FIG. 1, according to some embodiments.

FIG. 2 shows exemplary trajectories of a person's movement while they were playing the game of FIG. 1. The movement trajectories were determined by sampling an input position from an input controller, controlled by a person while the person plays the game. The input position can control a number of features of the player, including movement of the player and/or one or more actions of a player (e.g., utilization of a weapon). The numbers in FIG. 2 indicate the different targets (represented by asterisks). The small dots indicate the median of the player's movement trajectories, across several repeated trials for each target location. The circles represent the best-fits of a model of each movement trajectory.

Figure 3:
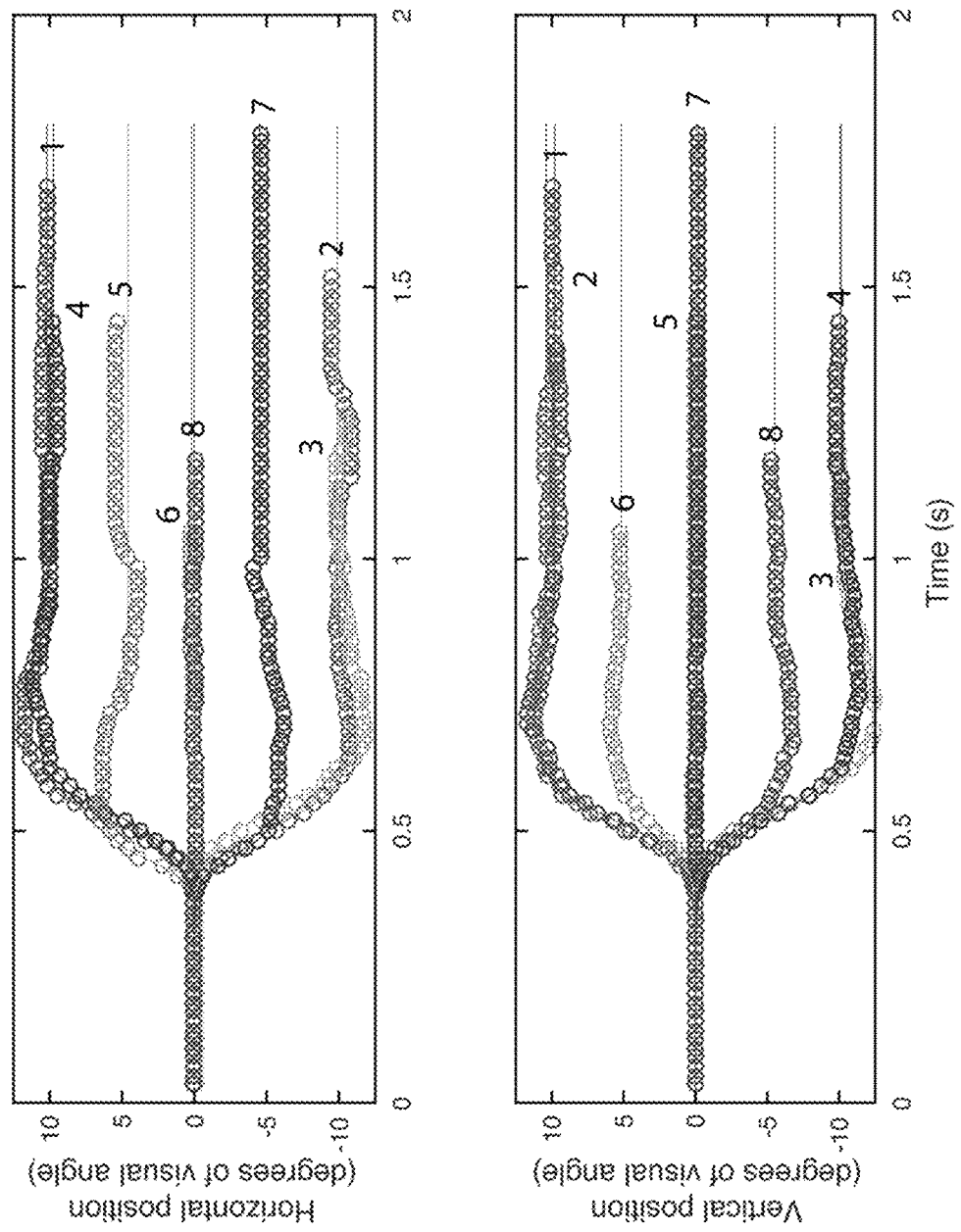
FIG. 3 illustrates exemplary trajectories of movement of a player over a period of time in the game of FIG. 1, according to some embodiments.

FIG. 3 shows movement time courses corresponding to the movement trajectories of FIG. 2. The top panel of FIG. 3 plots the horizontal component of the movements. The bottom panel plots the vertical component of the movements. The numbers indicate the different target locations of FIG. 2. The circles represent the median of the player's movements, across a plurality of repeated trials for each target location. The curves represent the best-fit model of each movement.

Figure 4:
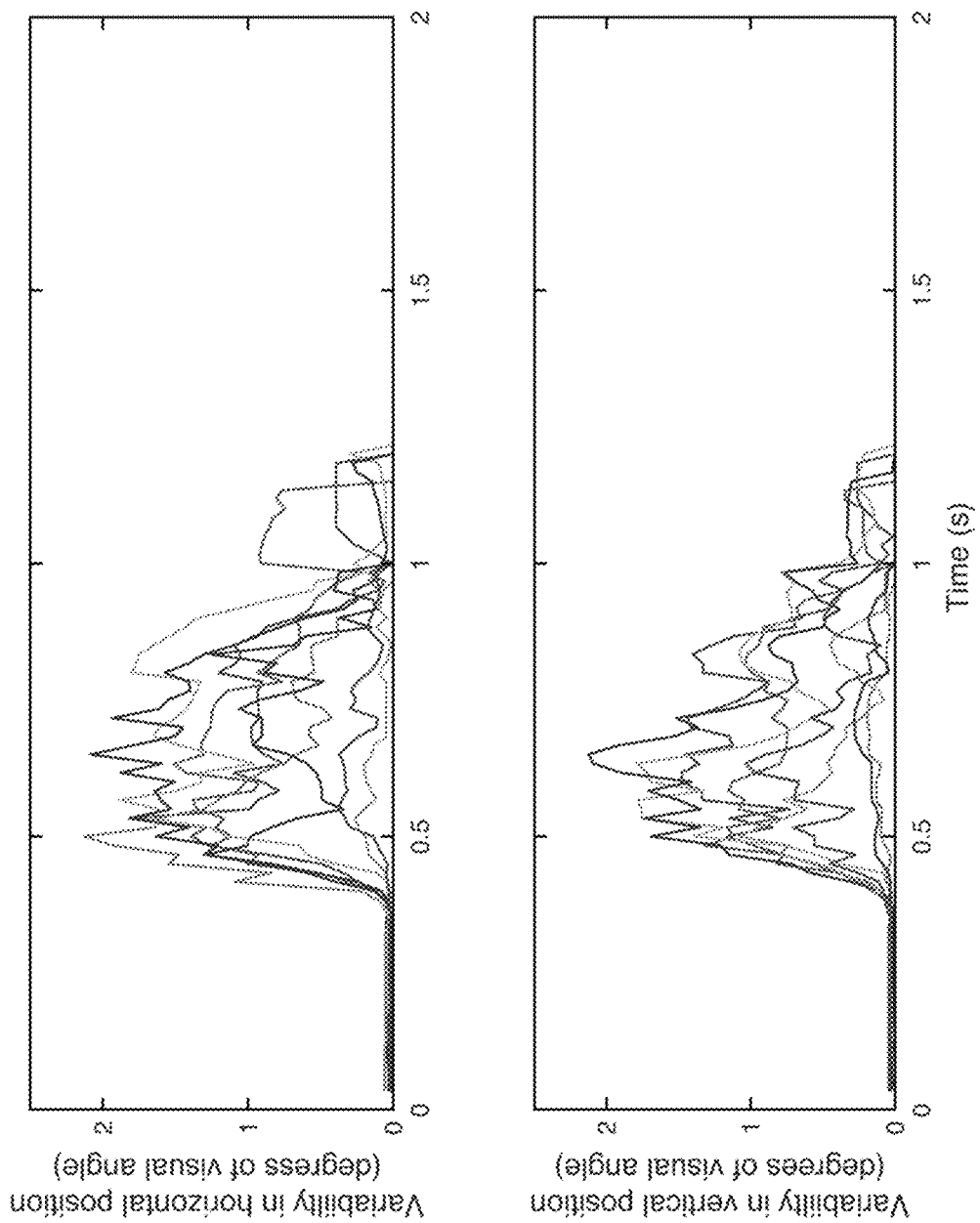
FIG. 4 illustrates an exemplary variability of a player's movement time courses during a previously played game described in FIG. 1, according to some embodiments.

FIG. 4 shows the variability of the movement time courses corresponding to the movement trajectories of FIG. 2. The top panel of FIG. 4 plots the variability of the horizontal component of the movements. The bottom panel plots the variability of the vertical component of the movements. The eight curves in each panel correspond to the different target locations of FIG. 2. In this example, variability was computed using a robust measure of the standard deviation (the median of the squared deviations from the median).

Figure 5:
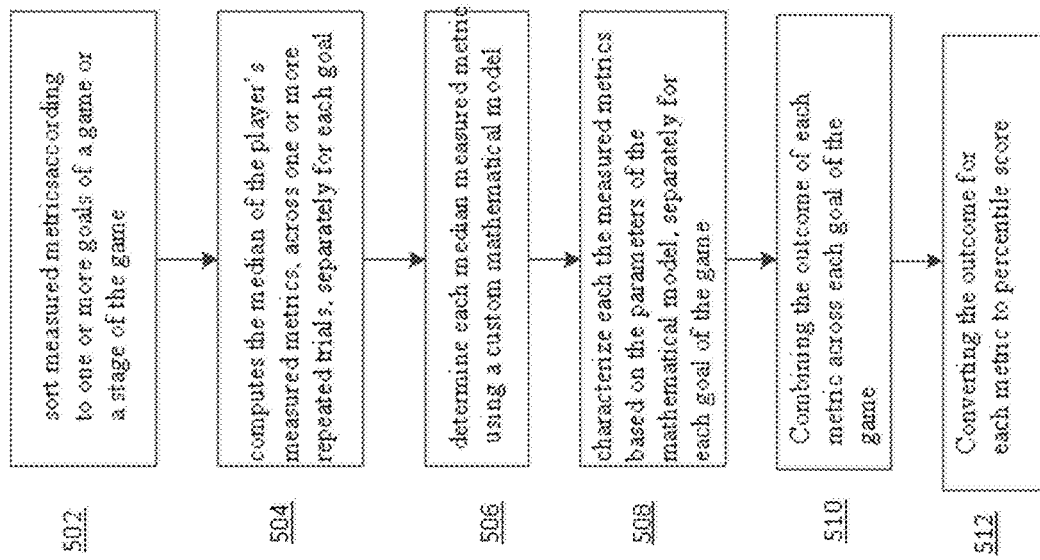
FIG. 5 illustrates a process for assessing one or more metrics of a player of a game, according to some embodiments.

FIG. 5 illustrates a method of assessing one or more metrics of a player of a game, in accordance with an exemplary embodiment. As stated above, the metrics of a player can include speed, accuracy, precision, and/or reaction time. Accordingly, in the exemplary method, at step 502, the measured metrics are sorted according to one or more goals of a game or a stage of the game (e.g., different target locations, durations, and/or sizes). At step 504, the median of the measured metrics is computed across one or more repeated trials, separately for each goal. For example, the median of the player's movement trajectories is computed across one or more repeated trials, separately for each goal. Exemplary median movement trajectories are displayed as the small dots in FIG. 2 and as the circles in FIG. 3. At step 506, each of the measured metrics is determined by using a custom mathematical model. For example, each of these median movement trajectories is fit with a mathematical model. The movement trajectories can be modeled as having two component movements: an initial movement that ends near the location of a target followed by a corrective movement that ends closer to the target. These two components are evident in the examples displayed in FIGS. 2 and 3. For the movement trajectories displayed in FIGS. 2 and 3, the player's initial movements tend to be hypermetric, passing beyond the targets, and then the corrective movements are in the opposite direction back toward the target. For other players, the initial movements could be hypometric, falling short of the target. Other players might exhibit hypermetric movements for some target locations and hypometric movements for other target locations. In some embodiments, the two component movements are modeled as two successive sigmoidal functions:

a.
$$f(t; a, b, c) = \frac{a}{1 + e^{b(t-c)}} \quad [\text{Eq. 1}]$$

b.
$$x(t) = f(t; p_1, p_3, p_4) + f(t; p_5, p_7, p_8) \quad [\text{Eq. 2}]$$

c.
$$y(t) = f(t; p_2, p_3, p_4) + f(t; p_6, p_7, p_8) \quad [\text{Eq. 3}]$$

Eq. 1 defines the sigmoidal function. The values of x(t) in Eq. 2 represent a model of the horizontal component of the movement trajectory for each time sample (examples of which are shown in the top panel of FIG. 3). The values of y(t) in Eq. 3 represent a model of the vertical component of the movement trajectory for each time sample (examples of which are shown in the bottom panel of FIG. 3). In some embodiments, the values of the parameters, $p_1$, $p_2$, $p_3$, $p_4$, $p_5$, $p_6$, $p_7$, and $p_8$, are fit to the median movement trajectories, separately for each target location. The best-fit parameter values are determined by using the Levenberg-Marquardt algorithm. The circles in FIG. 2 and curves in FIG. 3 are examples of models of the movement trajectories, as expressed by Eq. 1, with best-fit values for the parameters.

At step 508, the best-fit values of the parameters are used along with the following equations to characterize each metric of the game. For example, the best fit values of the parameters are used to quantify the player's speed, precision, accuracy, and reaction time, separately for each target location:

a.
$$\text{Speed} = \frac{a_m}{f'(p_4; a_m, p_3, p_4)} \quad [\text{Eq. 4}]$$

b.
$$\text{Precision} = \frac{v(p_4)}{a_t} \quad [\text{Eq. 5}]$$

-continued c.
$$\text{Accuracy} = \frac{e^T u}{a_t} \quad \text{[Eq. 6]}$$

d.
$$\text{ReactionTime} = p_4 - \frac{1}{2}\text{Speed} \quad \text{[Eq. 7]}$$

The function $f'(t)$ in Eq. 4 is the derivative of the sigmoidal function:

e. $f'(t;a,b,c)=bc[f(t;1,b,c)][1-f(t;1,b,c)]$ [Eq. 8]

The value of $a_m$ in Eq. 4 represents the amplitude of the first of the two component movements:

f. $a_m = \sqrt{(p_1)^2 + (p_2)^2}$ [Eq. 9]

The value of $a_t$ in Eq. 5 represents the distance to the target location:

g. $a_t = \sqrt{(x_t)^2 + (y_t)^2}$ [Eq. 10]

where $(x_t, y_t)$ is the target location. The values of $v(t)$ in Eq. 5 represent the variability of the movement trajectory (examples of which are shown in FIG. 4), combined across the horizontal and vertical components of the movement. The vector e in Eq. 6 represents the movement error:

h. $e = (p_1 - x_t, p_2 - y_t)$ [Eq. 11]

Finally, the vector u in Eq. 6 represents a unit vector in the direction of the target location:

i.
$$u = \frac{(x_t, y_t)}{\|(x_t, y_t)\|} \quad \text{[Eq. 12]}$$

In some embodiments, speed is quantified (Eq. 4) as movement duration and has units of milliseconds. Precision is quantified (Eq. 5) as the variability of the movement trajectory, at the midpoint of the movement, scaled by the distance to the target location and has units of percent. Accuracy (Eq. 6) is quantified as the error of the initial component of the movement and has units of percent. Positive values for accuracy indicate that the movements are hypermetric whereas negative values indicate that the movements are hypometric. Reaction time (Eq. 7) is quantified as the midpoint of the movement minus half the movement duration and has units of milliseconds. At step 510, the outcome of each metric is combined across each goal of the game. For example, the outcome for speed, precision, accuracy, and reaction time are combined across target locations by averaging across target locations. At 512, the outcome for each metric is converted to percentile score, such as by computing the player's performance against others who have played the game. For example, the values for speed, precision, accuracy, and reaction time are converted to percentile scores, by comparing the player's performance with others who have played the game. A person of ordinary skill in the art would recognize that a variety of different computations could be used to compute speed, accuracy, precision, and reaction time from the player's movements. For example, precision could be quantified as the average of the variability of the movement trajectory, averaged across the duration of the movement (in addition to or instead of the variability at the at the midpoint of the movement as expressed in Eq. 5).

As stated above, the game can assess one or more metrics. According to an embodiment, the game can determine the accuracy, speed, and precision of the player's shots. Accuracy can be computed as a hit rate (e.g., the proportion or percentage of targets that are hit) separately for each target location, target size, and/or target duration, and can be averaged across locations, sizes, and/or durations. Speed can be computed as the average amount of time it takes to hit the targets (e.g., the time interval from target presentation until it is hit), separately for each target location and/or target size, and averaged across locations and/or sizes. Speed can also be characterized as the distribution or cumulative distribution of such time intervals (i.e., the cumulative hit rate over time). Precision can be characterized as the distribution of shot locations relative to each target location.

According to another embodiment, the game can determine gain, gain variability, spatial bias, kills per sec, time per kill, lapse rate, tracking accuracy, consistency, flick accuracy, and efficiency. Gain can be computed as the distance of the player's input device movement divided by the distance to the target from the initial input device location before the movement. Gain variability can be computed as the variance of the gain, across a plurality of targets. Spatial bias can be computed as the mean and/or variance of any given metric (e.g., accuracy, reaction time, etc.) as a function of location in a game scenario. Kills per sec can be computed as the total number of targets destroyed divided by the amount of time (e.g., in seconds) that the player performed a training task. Time per kill can be computed as the amount of time (e.g., in seconds) from a target appearing until the player kills the target. Lapse rate can be computed as the number of targets to which the player failed to respond divided by the total number of targets presented. Tracking accuracy can be computed as the number of accurate shots divided by the total number of shots in tasks that require smooth pursuit (rather than ballistic) movements to hit a target. Consistency can be computed as the variance in the distribution of any given metric (e.g., accuracy, reaction time, etc.), across a plurality of targets. Flick accuracy can be computed as the number of accurate shots divided by the total number of targets presented in tasks that require ballistic (rather than smooth pursuit) movements to hit a target. Efficiency can be computed as the total number of accurate shots divided by the total number of shots plus the player's lapse rate, wherein the lapse rate is as computed as described above.

The game can comprise one or more scenarios for assessing a metric. According to an embodiment, the scenarios can relate to visual-detection reaction time, auditory spatial-localization accuracy, change detection accuracy, and decision accuracy. In the visual-detection reaction time scenario, the player must respond as quickly as possible to targets presented at randomized locations in a virtual environment. Targets are visible for as long as it takes for the player to respond. This scenario measures how quickly a player can recognize a new object in a virtual environment. In the auditory spatial-localization accuracy scenario, targets are presented 360 degrees around the player in either random or equidistant patterns in a virtual environment. One of the targets emits an audible cue, signaling the player to shoot the target that emitted the audible cue. This scenario measures how well a player can spatially localize an auditory cue. In the change detection accuracy scenario, targets are presented randomly in front of the player for a brief amount of time before they disappear. After a short duration, the same targets reappear with one target in particular having a feature change (e.g., different color, different spatial position, etc.).

The player must shoot the target with the feature that has been changed. This scenario measures the player's short-term memory and cognitive capacity. In the go/no-go scenario, a target of a particular color is presented for the player to shoot. Once hit, the target disappears and a new target randomly appears. The new target is the same or different color as the previous target. The player is given a rule to follow, either to shoot or ignore the second target if the second target color matches the first target. Depending on a given rule, the player must decide to either shoot the new target or ignore it. This scenario measures the player's ability to follow rules, make decisions, and inhibit unnecessary responses.

Figure 6:
FIG. 6 illustrates a screen shot of a scorecard presented to a player after a round previously played in the game of FIG. 1, according to some embodiments.

FIG. 6 illustrates a screen shot of a scorecard presented to a player after a round of a target practice game. The left side of the scorecard comprises a plurality of dots corresponding to the locations of targets that a player attempted to shoot. The dots can be of different colors that indicate shot speed and/or accuracy at each target. The dots can also be of different sizes that correspond to number of targets presented at each location. For example, green dots could be used to indicate locations where the player was fast and accurate (e.g., the player was able to hit the small targets at those locations even when the targets were presented only for brief periods of time). Red dots could be used to indicate locations where the player was slow and inaccurate (e.g., the player was unable to hit targets at those locations unless the targets were large and also presented for relatively long periods of time). Orange and yellow dots could be used to indicate intermediate levels of performance such that performance is worst at locations indicated by red dots, and progressively better for orange dots then yellow dots and then green dots. The right side of the scorecard comprises numerical representations of performance assessment. The circles in the top-right of the score card shows percentile scores for accuracy, reaction time, and overall performance in comparison to other players. The left column lists some performance statistics for the current practice session and the right column lists some performance statistics for this player's best practice session.

Figure 7:
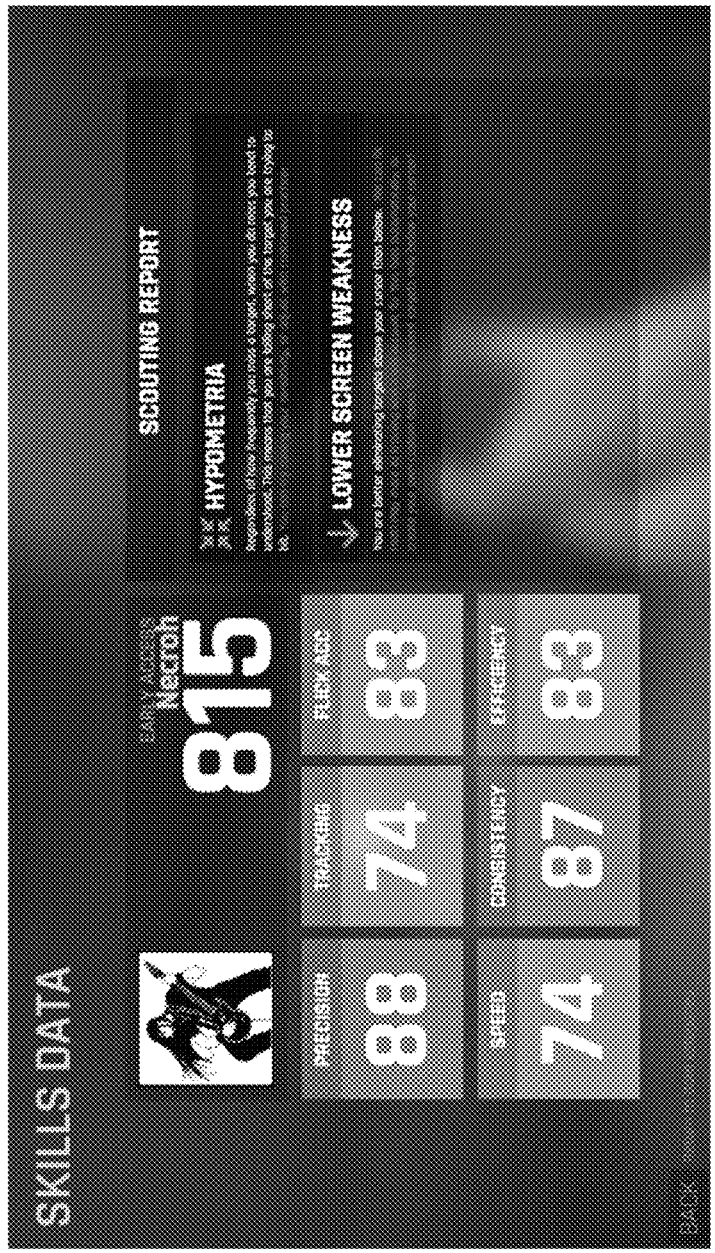
FIG. 7 illustrates a screen shot of a scorecard that summarizes a player's performance for multiple rounds played in the game of FIG. 1, according to some embodiments.

FIG. 7 illustrates a screen shot of a scorecard that summarizes a player's performance for multiple rounds of a practice game. The upper left portion of the screen shot displays the player's name, avatar, as well as their composite score rating. Below this, separate composite metrics are displayed and labeled (i.e., tracking accuracy, efficiency, etc.). The right portion of the screen shot displays short descriptive summaries of observations made from the player's data across all metrics. For instance, in this screen shot, there is a description of "Lower Screen Weakness" that explains to the player that they are less accurate when responding to targets in the bottom half of the screen compared to the top half of the screen.

Figure 8:
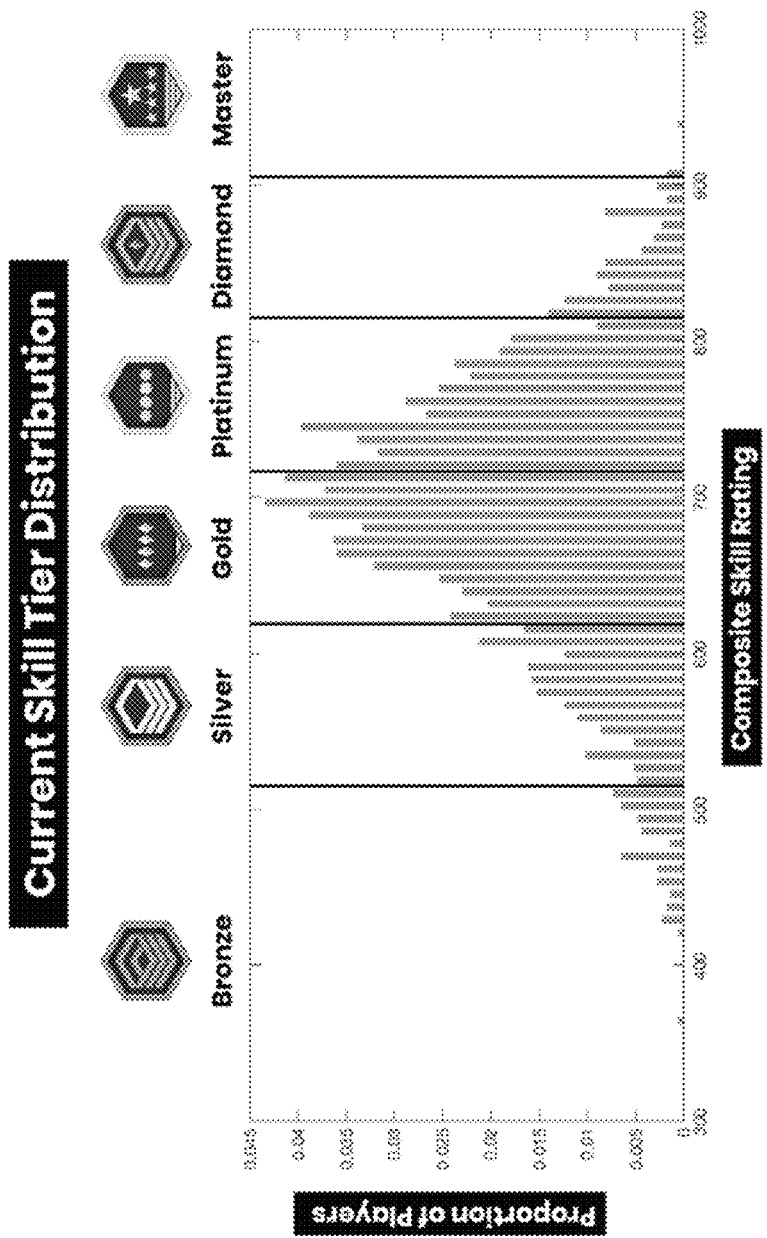
FIG. 8 illustrates a screen shot comparing a player's performance with others who have played while the player plays the game of FIG. 1, according to some embodiments.

FIG. 8 illustrates a screen shot from a target practice game which compares a player's performance with others who have played the game. The x-axis represents the composite skill score shown in FIG. 7. The y-axis represents the proportion of players with that composite skill score. This allows the player to see the overall distribution of composite skill scores across a population of players, and to see where they fall in that distribution. Bins of scores can be broken down into skill tiers (e.g., bronze, silver, gold, etc.), as shown at the top of the screen shot.

Figure 9:
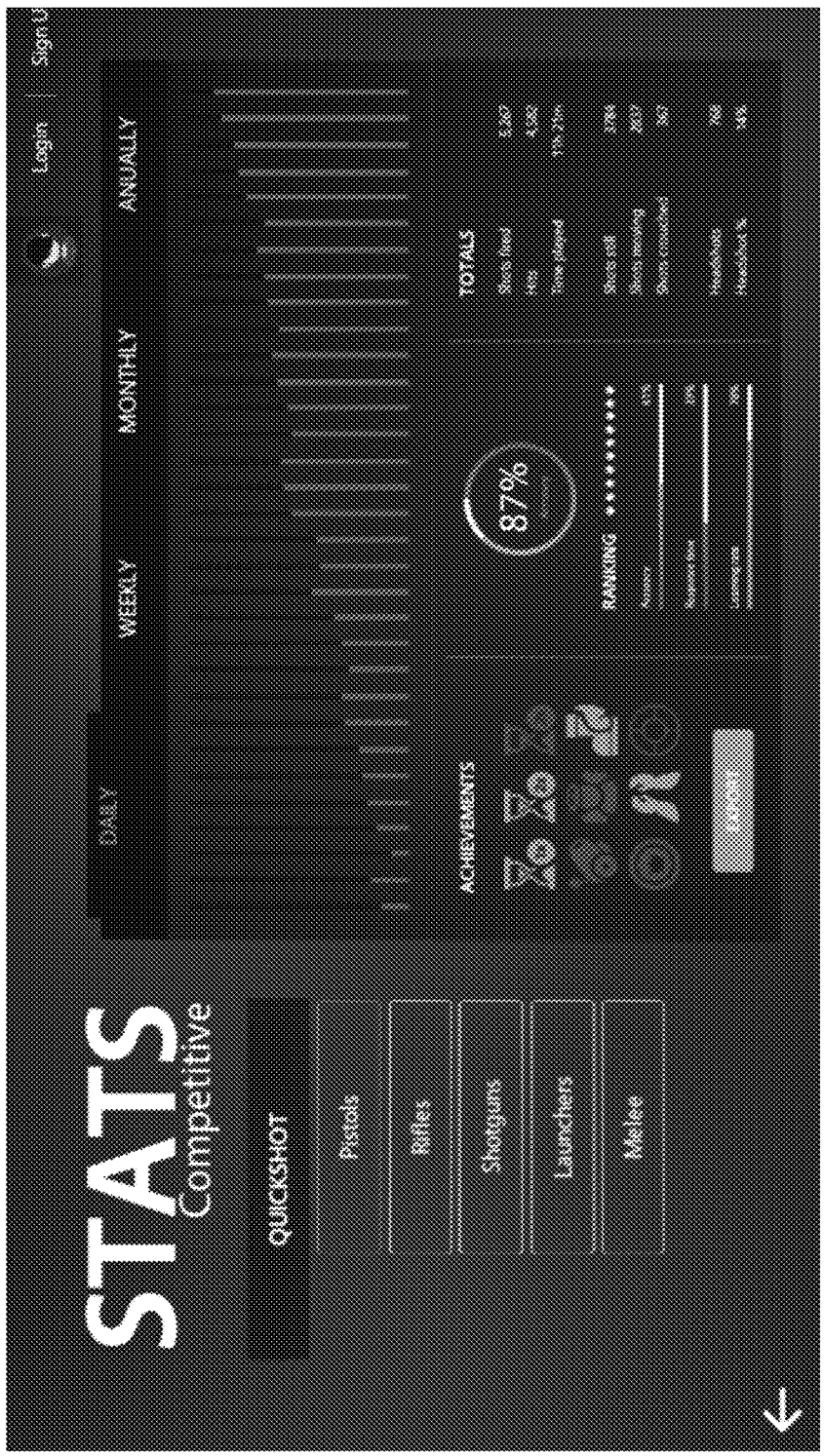
FIG. 9 illustrates a screenshot displaying a player's improvement over time from the game described in FIG. 1, according to some embodiments.

FIG. 9 illustrates a screen shot from a target practice game that depicts a player's improvement over time. Players can sort their data by weapon (left side of the screen) and by bins of time (top of the screen—daily, weekly, monthly, annually). The graph displays a given metric of interest chosen by the player (e.g., accuracy, reaction time, etc.), with additional data displayed below such as achievements or milestones attained by the player.

Figure 10:
FIG. 10 illustrates an exemplary screenshot from a game that provides assessment and training capabilities of a player of a game, according to some embodiments.

FIG. 10 shows a screen shot from a zombie apocalypse game. The player's goal is to shoot each zombie in the head while the zombies are moving through a 3D virtual environment to attack the player. A person of skill in the art recognizes that a zombie can be stopped only by shooting it in the head. If a zombie reaches the player before being shot in the head, then the round is over. Difficulty can be automatically adjusted from round-to-round based on the player's performance, and can be adjusted by changing the number of zombies and the manner in which they move (speed, direction, and predictability of motion). For example, a zombie running directly toward the player is relatively easy to hit, a zombie moving laterally is more difficult to hit, and a zombie running quickly on a serpentine path zigzagging toward the player, with reversals in direction at unpredictable times, is even more difficult to hit. Feedback can also be provided to train the player and improve their performance. This can occur from the player's interaction with the game. For example, blood spurts from the zombie's head when it is hit in the head, and the spatial distribution of spurting blood indicates the accuracy of the shot. Along these lines, if the player shoots the zombie in the center of its head, then blood spurts symmetrically in all directions, and if the player clips the right or left of the head, then the blood spurts asymmetrically to that direction.

One embodiment is a system comprising a computer and computer program that implements a game (e.g., an eSport game) configured to assess a player's ability and to train the player to improve their performance. The computer program can present sensory stimulation to the player via a display that corresponds to a three-dimensional virtual environment. The computer program also receives input signals from one or more input controllers, operated by a player, to control the player's movements in the virtual environment. The computer program changes the state of the virtual environment based on the input signals, and re-renders the sensory stimulation dynamically over time according to the changes of state of the virtual environment. The computer program, furthermore, evaluates the input signals from the input controller to assess the player's performance. The computer program then dynamically manipulates the sensory stimulation and/or the evaluation of the input signals to train the player to improve their performance.

In some embodiments, the eSport is a first-person shooter (FPS) eSport like Overwatch. In other embodiments, the eSport is a multiplayer online battle arena (MOBA) eSport like Star Craft or League of Legends. A person of skill in the art recognizes that other eSports or other classes of eSports could be substituted, including those that have not yet been reduced to practice.

In some embodiments, an individual plays the eSport by themselves. In other embodiments, multiple people, teams of players and opponents, play at once.

The sensory stimulation includes visual, auditory, and/or somatosensory stimulation. Visual images can be rendered on a computer monitor, a laptop display, a video projector, a mobile device, a virtual reality display or headset, or an augmented reality display or headset. Sensory stimulation can also be rendered with brain-computer interface (also called brain-machine interface) methods, devices, apparatuses, or systems for stimulating neural activity, including, but not limited to, retinal prostheses and cochlear implants. A person of skill in the art recognizes that other devices, apparatuses, or systems for presenting visual stimulation could be substituted, including those that have not yet been reduced to practice. Likewise, a person of skill in the art recognizes that there are a variety of devices or apparatuses for presenting auditory or somatosensory stimulation, and a person of skill in the art recognizes any such devices, apparatuses, or systems could be substituted, including those that have not yet been reduced to practice.

Examples of input controllers include keyboard, mouse, gaming mouse, video game console, joystick, accelerometer, pointing device, motion capture, Wii remote controller, eye tracker, computer vision system, or any of a variety of methods, devices, apparatuses, and systems for sensing, measuring or estimating human movement to provide input signals to a computer. Examples of human movements include hand movements, arm movements, head movements, body movements, and eye movements. Examples of input controllers also include brain-computer interface methods, devices, apparatuses, and systems for sensing, measuring or estimating brain activity. Examples of brain-computer interfaces include, but are not limited to, devices that measure electrophysiological signals (e.g., using EEG, MEG, microelectrodes) and optical signals (e.g., using voltage-sensitive dyes, calcium indicators, intrinsic signals, functional near-infrared spectroscopy, etc.). Examples of brain-computer interfaces also include other neuroimaging techniques (e.g., functional magnetic resonance imaging). Examples of input controllers also include methods, devices, apparatuses, or systems for sensing, measuring or estimating physiological data. Physiological data includes, but is not limited to, EEG, EKG, EMG, EOG, pupil size, and biomechanical data relating to breathing and/or respiration. A person of skill in the art recognizes that any such input controller or any combination of such input controllers could be used. It is also recognized that other methods, devices, apparatuses, or systems for sensing, measuring or estimating human movement or physiological activity could be substituted, including those that have not yet been reduced to practice.

Input signals include digital input codes (e.g., ascii keyboard codes, mouse clicks) or analog electrical signals. The input signals could be provided to the computer via electrical (e.g., USB) or wireless interface.

The virtual environment is either two-dimensional (2D) or three-dimensional (3D). The state of virtual environment includes, but is not limited to, the 2D or 3D position and orientation of the viewpoint of the player, the 2D or 3D position and orientation of the virtual character or agent being controlled by the player, the 2D or 3D position and orientation of the characters being controlled by teammates, the 2D or 3D position and orientation of objects in the virtual environment, the 2D or 3D position and orientation of virtual opponents, the status (e.g., health) of the virtual character being controlled by the player, the status of virtual teammates, and the status of virtual opponents. The state of the environment also optionally includes factors that determine the simulated movements of objects in the virtual environment (e.g., force, mass, gravity, friction). A person of skill in the art recognizes that the system could perform an accurate physical simulation of the virtual environment in accord with the physics of motion. It is also recognized that the system could simulate an alternative physics of motion that does not correspond to such a real environment. In addition, the state of the environment optionally includes lighting and factors that determine the rendering of sensory stimulation (e.g., field of view for rendering images). A person of skill in the art recognizes that the system could perform an accurate physical simulation of the virtual environment in accordance with the physics of light (for visual stimulation), sound (for auditory stimulation), and pressure (for somatosensory stimulation). It is also recognized that the system could simulate an alternative physics of light, sound, or pressure that does not correspond to such a real environment.

Each player interacts with the virtual environment. Examples of these interactions include moving (e.g., changing position, pose, orientation, etc.) characters being controlled by each player, and/or moving other objects in the virtual environment, via an input controller. Examples of moving other objects in the virtual environment include picking-up, carrying, and putting-down objects, firing projectiles, etc.

Assessing performance optionally includes, but is not limited to, measuring the speed and/or accuracy of a player's movements. Accuracy can be measured in units of distance or as a hit rate (e.g., a percentage or proportion of targets hit). Speed can be measured in units of time (e.g., milliseconds) or distance per unit time (e.g., miles per hour). Assessing performance can also optionally include measuring precision and reaction time. Assessing performance can also optionally include measuring a player's speed-accuracy tradeoff curve. Assessing performance can also optionally include measuring the relative value of a series of movements executed by a player. The relative value of a series of movements depends on the objective goals of the game. For example, the "Cornershot/Pentakill" scenario described above, requires a player to make a series of movements to shoot a plurality of targets and performance can be measured as the hit rate. Assessing performance can also optionally include measuring visual-detection reaction time, auditory spatial-localization accuracy, change detection accuracy, and/or accuracy in decisions about whether or not to perform an action in the game (e.g., shoot). Assessing performance can also optionally include measuring movement gain, gain variability, spatial bias, actions per second (e.g., kills per second), time per action (e.g., time per kill), lapse rate, tracking accuracy, consistency, flick accuracy, and/or efficiency. Assessing performance can also optionally include measuring decision-making abilities in flexible contexts, visual acuity, memory, learning rate, cognitive control to ignore distractors, and/or rate of adaptation. Assessing performance can also optionally include measures that are established in the prior art and in the eSports and video game industry, including kill-death ratio, damage dealt, damage accrued, damage blocked, time spent on objective, kills or deaths by objective, critical damage, healing dealt, healing accrued, assists, and/or final blows. Kill-death ratio can be the total number of enemies killed by a player divided by the number of times enemies kill that player. Damage dealt can be a weighted hit rate. The weight can depend on the weapon used by the player. Damage dealt can be the sum of the player's accurate shots to enemies, and can be each multiplied by the weapon-dependent weight. Damage accrued can be the number of accurate shots enemies have landed on a player, and can be each multiplied by a weapon-dependent weight. Damage blocked can be the amount of damage enemies have attempted to inflict on a player that was blocked by the player using a shield or skill that absorbs enemy damage, preventing it from being applied to the player. Time spent on an objective can be the amount of time (e.g., in seconds) a player spends within the boundaries of a given objective (e.g., remaining in a particular spatial position of a map). Kills or deaths by objective can represent the number of times enemies have killed the player or number of enemies the player has killed while the player and enemies were located within the boundaries of a given objective. Critical damage can represent the total amount of damage a player has inflicted on an enemy by landing shots in a critical area, such as the head of an enemy (i.e., a headshot). Healing dealt can represent the total amount of healing a player has applied to teammates. Healing accrued can represent the total amount of healing a player has received from teammates. Assists can represent the number of enemies a player has dealt damage to, regardless of whether the player also delivered the final amount of damage that killed an enemy (i.e., final blow). Final blows can represent the total number of enemies for which the player dealt the final amount of damage that killed an enemy.

For input controllers that sense or measure physical movements (e.g., mouse, keyboard, eye tracker, motion capture, etc.), there are various methods for quantifying the speed of a player's movements. In one embodiment, speed can be quantified as the duration of time between the onset of a movement and the termination of the movement. In another embodiment, speed can be quantified as the duration of time between the appearance of a target and the termination of a movement.

Human movements typically have multiple different stages. For example, a movement typically consists of an initial movement that lands near the location of a target followed by one or more corrective movements that land closer to the target. In one embodiment, speed can be quantified as the durations of each such component movement. In another embodiment, speed can be quantified as the entire duration of the initial movement plus the durations of one or more of the corrective movements. In another embodiment, speed can be quantified as the entire duration of a series of actions and decisions to attain a goal, for example, completing an in-game objective with a series of movements. In another embodiment, speed can be quantified as the amount of time it takes to achieve an objective. For example, speed can refer to the time interval from target presentation until it is hit. In another embodiment, speed can be characterized as the distribution or cumulative distribution of such time intervals For example, speed can be characterized as the cumulative hit rate over time. Speed can be measured separately for each target or combined (e.g., by averaging) across multiple targets.

For input controllers that sense or measure physical movements (e.g., mouse, keyboard, eye tracker, motion capture, etc.), there are various methods for quantifying the accuracy of a player's movements. As noted above, each such input controller senses, measures, or estimates human movement and provides input signals to a computer to interact with the virtual environment. For example, the input signals could change 2D or 3D position and orientation of the virtual character being controlled by the player, or the 2D or 3D position and orientation of a virtual object in the virtual environment of the game. In one embodiment, the input signals control a cursor that is rendered on a computer monitor. The accuracy of a player's movements can be quantified either in terms of the physical movement in the real environment (e.g., the position or relative position of the mouse), or in terms of the virtual movement in the virtual environment (e.g., the position of a cursor that is controlled by the mouse). For example, the 2D screen position of a cursor on a computer monitor can be compared to the 2D projection of the 3D location of an object in the virtual environment. To do so, the computer converts a 3D location in the virtual environment to the corresponding 2D screen position that is the projection of that 3D location. In another embodiment, accuracy can be quantified in terms of the 2D or 3D position and orientation of a virtual object in the virtual environment. As noted above, human movements typically have multiple different stages. In one embodiment, the accuracy of the initial movement can be quantified. In another embodiment, the accuracy of the final end point after one or more of the corrective movements can be quantified together with the original movement. In another embodiment, the accuracies of each component movement can be quantified. The accuracy of an individual movement can be quantified as the error between the executed movement and the desired movement, for example, the difference between the end point of a cursor movement and the position of a target on the computer display. The accuracy includes the magnitude and/or direction of the error. In one embodiment, the distribution of such errors can be measured and characterized. The distribution of errors can be characterized by computing statistics from a plurality of such errors. Statistics that can be computed include mean, median, mode, variance, covariance, skewness, kurtosis, and higher order statistical moments. In another embodiment, the distribution of errors can be characterized by fitting a model to the plurality of such errors. The distribution of errors can be fit with a statistical model (e.g., a multivariate normal distribution). In another embodiment, the distribution of errors can be fit by a functional model (e.g., a model of the neural processing that controls eye movements or body movements). It is also recognized that various different statistical or functional models can be substituted, including those that have not yet been reduced to practice. Accuracy can be measured separately for each target or combined (e.g., by averaging) across targets.

Assessing performance can include the precision of a player's movements. According to an embodiment, precision can be quantified as the consistency of a movement when it is repeated, for example, when a target is presented at the same location multiple times. Consistency can be quantified as the standard deviation, across repeats, of the 2D or 3D positions and/or orientations of a virtual character being controlled by the player, or of the 2D or 3D positions and/or orientations of a virtual object in the virtual environment. Other statistics, in addition to standard deviation, can also be used to quantify precision, such as mean, median, mode, variance, covariance, skewness, kurtosis, and higher order statistical moments. Various different statistical or functional models can be substituted, including those that have not yet been reduced to practice. According to another embodiment, precision can be characterized as the spatial distribution of errors, i.e., the spatial distribution of shot locations relative to a target location. For example, the spatial distribution of errors can be fit with a statistical model (e.g., a multivariate normal distribution), and precision can be quantified as the variance and covariance of the best-fit normal distribution. It is also recognized that various different statistical or functional models can be substituted, including those that have not yet been reduced to practice. Precision can be measured separately for each target or combined (e.g., by averaging) across targets.

Assessing performance can also include the reaction time of a player's movements.

Assessing performance can be measured with physiological signals (e.g., brain-computer interface, EEG, EMG, etc.) from one or more input devices, as noted above. In one embodiment, the input signals from an input controller can be used to control a cursor that is rendered on a computer monitor, and the speed, precision, accuracy, and reaction time of a player's movements are quantified in terms of the position of a cursor. In another embodiment, the input signals from such an input controller can be used to control the 2D or 3D position and orientation of a virtual object in the virtual environment, and the speed, precision, accuracy, and reaction time of a player's movements are quantified in terms of the virtual movement in the virtual environment. The preceding paragraphs describe several embodiments with various methods for quantifying speed, precision, accuracy, and reaction time. Each of those methods for quantifying speed, precision, accuracy, and reaction time can be embodied with input controllers that measure either physical movements (e.g., mouse) or physiological signals (e.g., EMG). Various different statistical or functional models can be substituted for measuring speed, precision, accuracy, and/or reaction time from physiological signals, including those that have not yet been reduced to practice.

Figure 11:
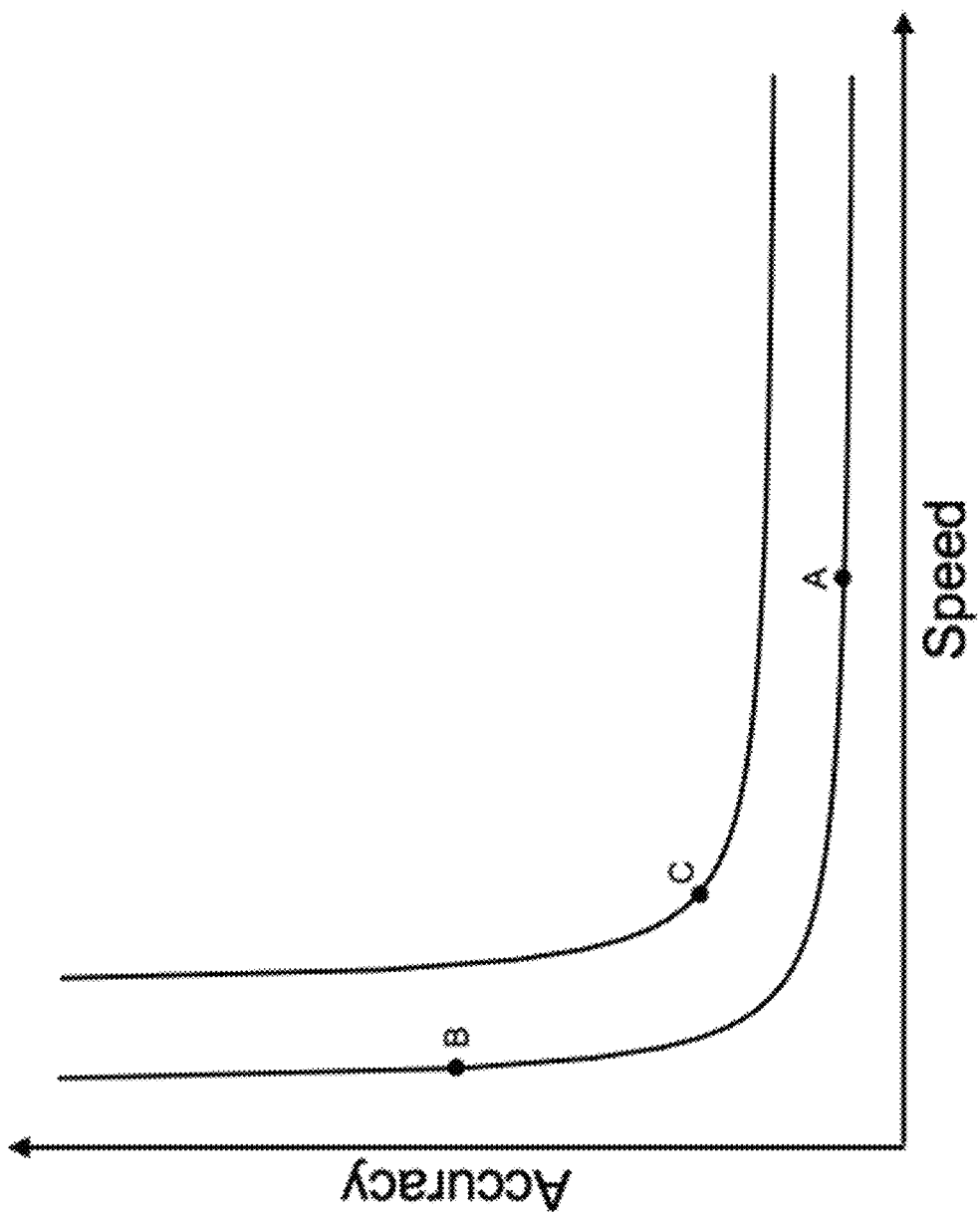
FIG. 11 illustrates an exemplary speed-accuracy tradeoff curves of a player in a game, according to some embodiments.

Assessing performance can also include analyzing a player's speed accuracy tradeoff. Typically, human behavior exhibits a speed-accuracy tradeoff. Faster movements are typically less accurate, and more accurate movements are typically slower. FIG. 11 illustrates an exemplary speed-accuracy tradeoff curves. The points A and B are on the same speed-accuracy tradeoff curve for a given player. The point labeled A corresponds to faster but less accurate performance compared to the point labeled B. The point labeled C is on a different speed-accuracy tradeoff curve. The curve that includes the point labeled C corresponds to a player that has overall better performance than the curve that includes the points labeled A and B.

Examples of improved performance include making faster and/or more accurate movements, making a more valuable series of movements versus alternative less valuable movements, making movements that correspond to a better speed-accuracy tradeoff curve, and making movements that correspond to a better tradeoff between speed and accuracy. In one embodiment, performance improvement can be indicated as a transition from one speed-accuracy tradeoff curve (e.g., the curve in FIG. 11 that includes points A or B) to a different speed-accuracy tradeoff curve (e.g., the curve in FIG. 11 that includes point C). In other embodiments, performance improvement can be indicated by any of the means described above for assessing performance.

One embodiment provides a service to help players choose teammates and/or to help teams and coaches identify and recruit talented players. Performance can be assessed for each of a plurality of players. The performance assessment can be shared via either a website or social network. The website or social network can provide a platform for players with complementary abilities to form teams and for coaches to choose players for particular positions on a team, based on the players' performance assessments. For example, in a game that has specific character classes or team roles (e.g., Overwatch), a first player with excellent decision-making skills but poor accuracy skills may be best complemented by playing with a second player with excellent accuracy skills, as each would fill specific team or class roles. This prevents teams from being constructed of players with skillsets with too much overlap leading to holes or weaknesses in team composition. Another example, in the case of games without specified class or team roles (e.g., Counterstrike Global Offensive), is a first player with high accuracy being matched with a second player of equal or similar accuracy skill, as mismatches in talent cause poor team performance and poorer gaming experiences.

In some embodiments, the computer program dynamically manipulates the sensory stimulation to train a player to improve their performance. For example, in a first-person shooter eSport game where a player's goal is to hit targets, the targets can be automatically placed at locations where the player is slow and/or inaccurate. The target locations can include 2D screen positions or 3D locations in the virtual environment.

In one embodiment, the targets are presented for a limited period of time and the target presentation duration is manipulated, depending on the history of the player's performance accuracy, separately for each location (2D screen position or 3D location in the virtual environment). The target presentation duration is randomized or pseudo-randomized over a range of different possible durations. Each possible duration can be selected independently for each target location, and can be adjusted dynamically over time as the player's performance improves. In one embodiment, the target presentation duration is manipulated by an adaptive staircase procedure in which the target presentation duration for a particular location is decreased after at least one hit at that location and the target presentation duration is increased after at least one miss at that location. In other embodiments, the target presentation duration is manipulated by the QUEST or BEST procedures. A person of skill in the art recognizes that other adaptive procedures or methods for manipulating target presentation duration could be substituted including those that have not yet been reduced to practice.

In one embodiment, the targets are presented at particular locations, depending on the history of the player's performance accuracy. Target locations on the screen (e.g., 2D coordinates) are determined by the individual player's performance in those screen locations. For example, if a player performs poorly in the upper-left portion of the screen compared elsewhere, then more targets will be presented in the upper-left portion of the screen relative to the distribution of targets elsewhere. The weighting of this distribution can be dependent upon the level of disparity in performance between locations. This distribution can be updated dynamically between training tasks to adapt the spatial distribution of targets for each new training task performed by the player.

Some embodiments provide the player with feedback about their performance. Examples of feedback include visual features or animations rendered as part of the virtual environment or superimposed on the rendered images of the virtual environment. These visual features or animations can be presented during or immediately following a player's movements. Examples of feedback also include cross-hairs or colored spots showing where a movement was made (e.g., where a shot was fired) in comparison to where it should have been made.

One embodiment comprises explosive feedback for when a player performs an objective or task. The explosive feedback can be indicative of how well the player performed the objective or task. For example, if the player hits the target dead center of an object, then the object explodes symmetrically in all directions. However, if the player clips the edge of the object, then the explosion of the object is asymmetrical in that direction. Moreover, if the player clips the right or left ear of a target, then blood spurts out to the right or left, respectively. Any of various different spatial distributions for the explosive feedback could be used.

Another embodiment comprises corrective feedback based on a player's action toward an objective or task. Corrective feedback can be used to train a player to improve their performance. For example, a target can be removed when a player initiates a movement toward the target. This forces the player to make a ballistic movement toward the remembered location of the target. The target is re-presented after the player completes a movement or fires one or more shots, thereby providing feedback to initiate a corrective movement. Due to the feedback and corrective movement, the player's initial ballistic movement will improve (faster and/or more accurate) over time with practice.

In another embodiment, feedback is a visual representation summarizing a player's performance over a period of time, e.g., indicating locations on the screen where movement speed and/or accuracy was better or worse.

Feedback also optionally includes auditory tones or sounds presented during or immediately following a player's movements. Feedback also optionally includes somatosensory stimulation.

Some embodiments include measuring a player's speed-accuracy tradeoff, and then training the player to improve their performance by learning to control their speed-accuracy tradeoff. For example, when playing against a fast opponent, a player should choose to be as fast as possible, even though they will typically be less accurate (e.g., corresponding to point A in FIG. 11). When playing against a slower but more accurate opponent, on the other hand, a player should choose to be slower and more accurate (e.g., corresponding to point B in FIG. 11). One embodiment is a first-person shooter eSport game in which a player's goal is to hit targets. Different targets (e.g., different colors such as red, yellow, and green) cue the player to be as fast as possible or as accurate as possible or various options in between, and the targets shoot back at the player with different latencies. The cue meaning "be as fast as possible" (e.g., green) fires back at the player with a short latency but with low accuracy, and the cue meaning "be as accurate as possible" (e.g., red) fires back at the player with long latency but very accurately. This enables measuring several samples (one for each of the different cues) on the speed-accuracy tradeoff curve. Over training, a player's entire speed-accuracy tradeoff curve can improve, shifting up and to the right in the graph illustrated in FIG. 11. In addition, this embodiment trains players to optimize where they choose to be on the speed-accuracy tradeoff curve for each target. Once a player is well trained, they will be able to choose on the fly to optimize their speed-accuracy depending on which opponent they are up against during a competition. A person of skill in the art recognizes that other procedures or methods for cueing players to trade off speed and accuracy could be substituted including those that have not yet been reduced to practice.

Some embodiments include training a player to be less prone to distraction. Sensorimotor performance depends on attention and a person's attention can be diverted by distracting stimuli. For example, a player's performance (e.g., speed and/or accuracy) in hitting a target at one location could be impaired by flashing a distracting non-target stimulus at a different location just before the target is presented. One embodiment is a target practice game with distractors. Targets and distractors are presented at various locations in the virtual environment. The visual appearance of targets and distractors differ from one another (e.g., color, shape, etc.). A player's goal is to hit the targets, and the player's performance is assessed by measuring speed and accuracy. The distractors are presented in advance of the targets, and the stimulus onset asynchrony (SOA, the interval of time between the distractor onset and the target onset) is manipulated, depending on the history of the player's performance accuracy, separately for each target location and for each distractor location (2D screen position or 3D location in the virtual environment). The SOA is randomized or pseudo-randomized over a range of duration values, the range of SOA duration values is selected independently for each target location and each distractor location, and the range of SOA duration values is adjusted dynamically over time as the player's performance improves. A person of skill in the art recognizes that various adaptive procedures or methods for manipulating SOA duration could be used including those described above, as well as those that have not yet been reduced to practice.

In some embodiments, the computer program dynamically manipulates the evaluation of input signals from an input device to train a player to adjust their movements of the input device accordingly. In one embodiment, a player's performance is improved by using a motor adaptation protocol to train the player to make faster and/or more accurate movements. In one embodiment, the mapping from mouse position to screen position is adjusted dynamically during training. For example, if a player's movement to a particular target location is hypometric then the mouse movements toward targets at that location are remapped so as to make the movement more hypometric. The player can then automatically learn to compensate for such changes, leading to improved performance accuracy. Other embodiments include manipulating the position, velocity, acceleration, or higher-order temporal derivatives of position acquired with one of the input controllers. Other embodiments include manipulating the orientation, angular velocity, angular acceleration, or higher-order temporal derivatives of orientation acquired with one of the input controllers. Other embodiments include manipulating the joint angle, angular velocity of joint angle, angular acceleration of joint angle, or higher-order temporal derivatives of joint angle acquired with one of the input controllers.

Other embodiments include assessing performance of a player as a part of a team. For example, multiple players, each assigned a specific combat role, can cooperate to accomplish one or more structured challenges, such as surviving an onslaught of enemy zombies. One player's role can be to damage and eliminate as many zombies as possible, while the other player's role can be to use a temporary shield or healing mechanic to blunt or heal damage caused by zombie enemies. The overall goal of the challenge is to survive as long as possible while zombie enemies attack both players in perpetuity. Performance can be measured by how long the team survives. Player performance can be assessed within the context of each player's assigned role, and can be modulated by the performance of their teammate. As such, the damage output of each enemy zombie is manipulated to increasingly tax and train the performance of the player assigned to heal or shield the other player, while the base amount of health of each zombie is manipulated to tax and train the abilities of the player assigned to dealing damage. This is used to test and train how well individual players can adapt and thrive in cooperation with other teammates, and to measure how the skill level of a teammate impacts an individual player's skill.

Additional embodiments are multiplayer objectives in which multiple players are assigned any combination of the following roles: damage dealer, healer, tank, or crowd control. The damage dealer uses a range of given weapons (e.g., guns, cybernetics, or magical powers) to inflict damage and ultimately kill enemies. A healer's role is the opposite; rather than inflict damage upon enemies, they heal damage caused by enemies to players on the healer's team. This can be done by any range of weapons (e.g., guns, cybernetics, or magic) or skills (e.g., cybernetics, magic). The goal of a tank is to shield teammates by absorbing as much enemy damage as possible through either an increase in base health, defensive tools (e.g., shields, armor), or powers (e.g., magic, cybernetics). Crowd control roles support their team by controlling the movement or abilities of enemies through various methods (e.g., guns with special abilities, magic, cybernetics). For example, a crowd control player may fire a weapon that slows down the movement or temporarily paralyzes an enemy combatant to prevent them from attacking the player's teammates, or making them easier to kill.

Some embodiments include performance scores. The scores can report different aspects of performance (e.g., speed, precision, accuracy, reaction time at each location in the virtual environment). Each aspect of performance can be scored separately, or the various individual scores can be combined into overall scores (e.g., overall speed combined across all locations, or overall performance combined across speed, precision, accuracy, and reaction time, and combined across all locations). The scores for different aspects of performance can be measured in different units. For example, speed can be measured in units of time (e.g., milliseconds), and accuracy can be measured in units of distance. To combine these disparate scores, some embodiments convert each performance score to a percentile score by comparing a player's individual performance with that of a plurality of other players. Then, the percentile scores can be further combined to compute an overall score. In one embodiment, for example, a player's speed is converted from units of time to a percentile and the player's accuracy is converted from units of distance to a percentile, and then the two percentile scores are averaged to compute an overall score. In some embodiments, a player can view a score card after each round. In some embodiments, a player can view visual representations of how their score changes over time with practice. In some embodiments, a player can compare their scores with other players. Some embodiments can include a leader board that shows the scores of the best players.

Another embodiment is a system for characterizing and classifying the strengths and weaknesses of players, by applying pattern recognition, pattern classification, or machine learning operations to analyze performance assessment data from a plurality of players and to compare the performance assessment of an individual player with that of the plurality of players. Pattern recognition pattern classification and machine learning operations can include correlation, canonical correlation, sum of squared difference, least-squares, partial least squares, nearest neighbor, Mahalanobis distance, regression, multiple linear regression, logistic regression, polynomial regression, general linear model, principal components analysis (PCA), singular value decomposition (SVD), factor analysis, principal components regression, independent components analysis (ICA), multidimensional scaling, dimensionality reduction, maximum likelihood classifier, maximum a posteriori classifier, Bayesian classifier, Bayesian decision rule, radial basis functions, linear discriminant analysis, regularized discriminant analysis, general linear discriminant analysis, flexible discriminant analysis, penalized discriminant analysis, mixture discriminant analysis, Fischer linear discriminant, regularization, density estimation, naive Bayes classifier, mixture model, Gaussian mixtures, minimum description length, cross-validation, bootstrap methods, EM algorithm, Markov chain Monte Carlo (MCMC) methods, regression trees, classification trees, boosting, AdaBoost, gradient boosting, neural network classifier, projection pursuit, projection pursuit regression, support vector machine, support vector classifier, K-means clustering. vector quantization, k-nearest-neighbor classifier, adaptive nearest-neighbor classifier, cluster analysis, clustering algorithms, k-medoids, hierarchical clustering, sparse principal components, non-negative matrix factorization, nonlinear dimension reduction, undirected graph models, statistical learning, supervised learning, and unsupervised learning. Embodiments of this disclosure are not limited to the pattern ecognition, pattern classification, and machine learning operations listed above, which are given as a subset of the pattern recognition, pattern classification, and machine learning operations that can be applied to process the performance assessment data.

Another embodiment is a system comprising a computer and a first computer program to assess a player's ability while they are playing an eSport or video game that is implemented in a second computer program that is operating in parallel on the same computer. The first computer program receives input signals from input controllers to measure the player's movements. The first computer program optionally reads from the computer memory to determine the state of the second computer program (the eSport) including the locations of targets. The first computer program, furthermore, evaluates the input signals from the input controller, to assess the player's performance while playing the eSport.

Other embodiments are cheater detection systems or methods. Some players cheat by running a second computer program (a cheat program) that is operating in parallel on the same computer as the first computer program (an eSport or a video game). The second computer program might, for example, read from the computer memory to determine the state of the first computer program (the eSport) including the locations of targets, and write to memory in such a way as to automatically shoot the targets without the need for the player to move or manipulate their input device. However, the second computer program does not mimic natural human movements. One embodiment for a cheat detector is a method that is incorporated into the first computer program (the eSport or a video game), and that compares the performance of a player with a database of natural human movements. A cheater is detected when the player's performance is inconsistent with natural human movements. Such cheat detection systems or methods operate by applying pattern recognition, pattern classification, or machine learning operations to analyze performance assessment data from a large number of players. Some pattern recognition operations, pattern classification, and machine learning are listed above.

Figure 12:
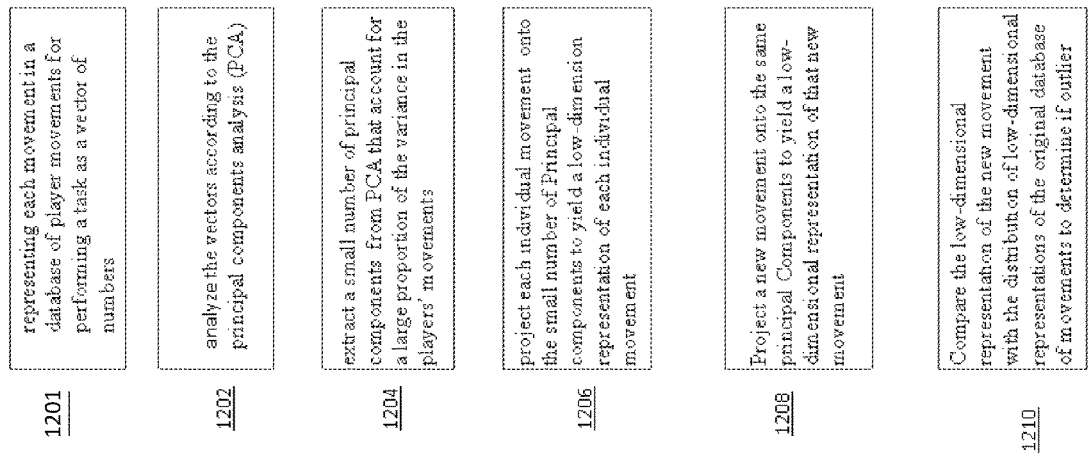
FIG. 12 illustrates a process for detecting a cheater in a game, according to some embodiments.

FIG. 12 illustrates an exemplary method for detecting a cheater in a game. First, at step 1201, each movement in a database of player movements for performing a task (e.g., shooting targets) is represented as a vector of numbers. For example, each number in each vector can represent the x- or y-coordinate of the 2D position of cursor controlled by a player using an input controller, such that the successive numbers in each vector can represent successive positions during a movement. Second, at step 1202, the vectors are processed to compute a principal components analysis (PCA). Principal component analysis (PCA) is a statistical procedure that converts an input set of vectors to an output set of vectors called principal components. The output set of vectors is an orthonormal basis for the input set of vectors. The projection (dot product) between any input vector and the principal components computes a vector of principal component scores. Third, at step 1204, a small number of principal components are extracted from PCA that account for a large proportion of the variance in the players' movements, The number of principal components extracted can range from 1 to N where N is the length of each input vector. But the number of principal components extracted is typically much smaller than N (for example, in the range 1 to 10). Fourth, at step 1206, each individual movement is projected onto the small number of principal components, thereby yielding a low-dimension representation of each individual movement. For example, 3 principal components can be used to compute 3 principal component scores for each input vector, even though each input vector can comprise hundreds of numbers. Fifth, at step 1208, a new movement (that was not included in the original database of movements) is projected onto the same principal components, yielding a low-dimensional representation of that new movement. Lastly, at step 1210, the low-dimensional representation of the new movement is compared with the distribution of low-dimensional representations of the original database of movements to determine if the new movement is an outlier, i.e., to classify the new movement as a natural human movement or a cheater. Other embodiments utilize other pattern. recognition, pattern classification, or machine learning operations in addition to, or instead of, PCA. Embodiments are not limited to the pattern recognition, pattern classification, and machine learning operations listed above, which are given as a subset of the pattern recognition, pattern classification, and machine learning operations that can be applied to detect cheaters.

Figure 13:
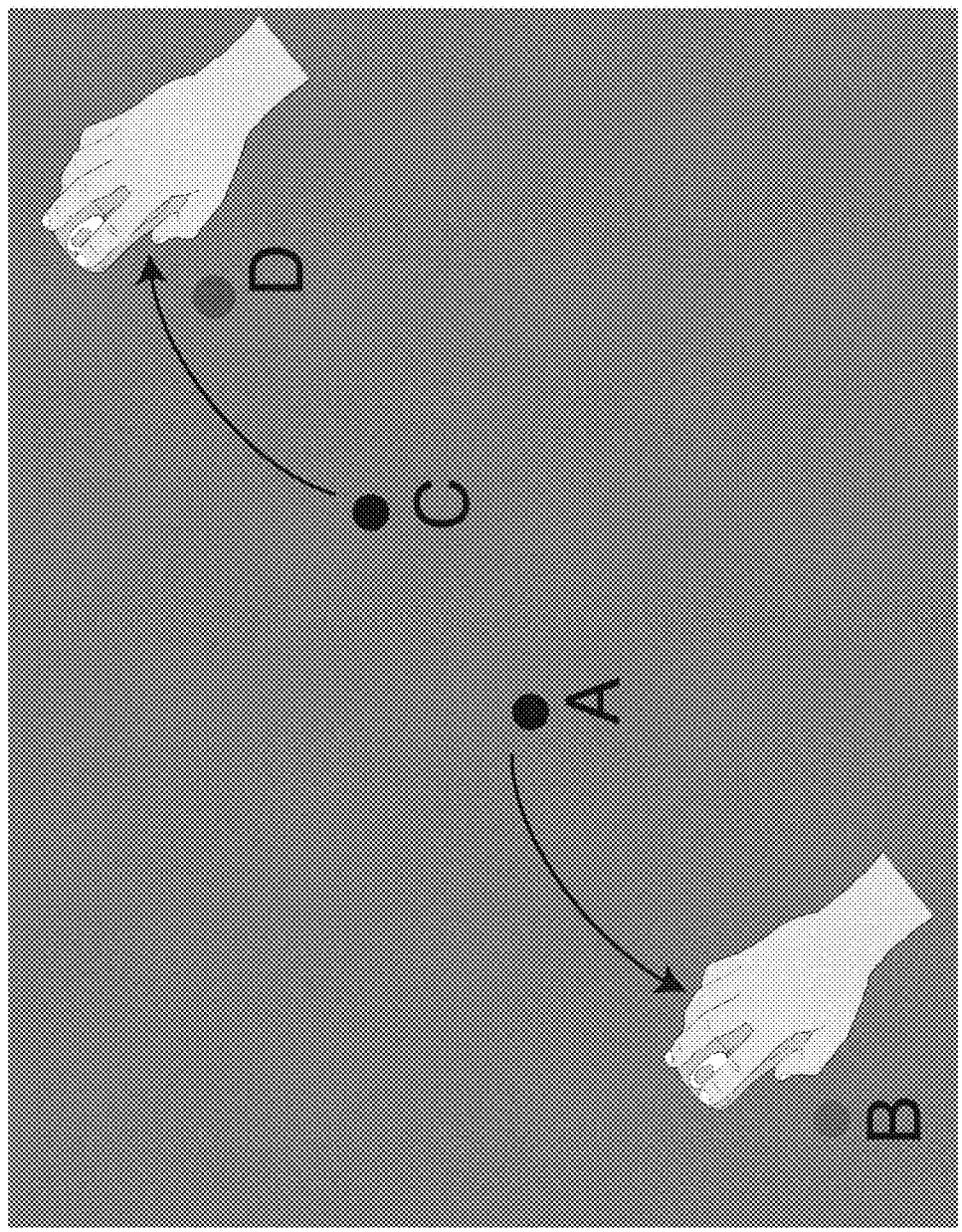
FIG. 13 illustrates exemplary systematic biases of a person's movements in a game, according to some embodiments.

Another embodiment is a smart input controller that corrects for biases in a player's movements. A person of skill in the art recognizes that a player's movements exhibit systematic biases. Some movement errors are random and best described by a statistical distribution. But other movement errors are systematic biases. FIG. 13, for example, illustrates an arm movement to reposition a mouse from point A toward point B. The arm movement is hypometric, falling short of the desired target. The figure also illustrates an arm movement from point C toward point D that is hypermetric, overshooting the desired target. In one embodiment, a player makes a series movements from each of a plurality of starting positions to each of a plurality of target positions. The position error (e.g., the amplitude and direction of the difference between the landing position of the movement and the position of the target) is measured for each movement, and the average movement error is computed for each combination of a starting position and a target position. The computer program then manipulates the evaluation of the input signals from the input controller to correct for systematic biases in the player's movements. Another embodiment measures and corrects for systematic biases in at least one of position, velocity, movement acceleration, and higher-order temporal derivatives of position. Another embodiment measures and corrects for systematic biases in at least one of orientation, angular velocity, angular acceleration, and higher-order temporal derivatives of orientation. Another embodiment measures and corrects for systematic biases in the joint angle of at least one joint. Another embodiment measures and corrects for systematic biases in at least one of angular velocity of joint angle, angular acceleration of joint angle, and higher-order temporal derivatives of joint angle. In one embodiment, the distribution of errors is characterized by fitting a model to the plurality of such errors, fit with a statistical model (e.g., a multivariate normal distribution). In another embodiment, the distribution of errors is fit by a functional model (e.g., a model of the neural processing that controls eye movements or body movements). It is also recognized that various different statistical or functional models could be substituted, including those that have not yet been reduced to practice.

Another embodiment is a computer program that sets the sensitivity on an input controller (e.g., the mouse sensitivity) that corrects for biases in a player's movements. A player makes a series movements from each of a plurality of starting positions to each of a plurality of target positions. The position error (e.g., the amplitude and direction of the difference between the landing position of the movement and the position of the target) is measured for each movement, and the average movement error is computed for each combination of a starting position and a target position. The computer program then manipulates the sensitivity of the input controller to correct for systematic biases in the player's movements.

Figure 14:
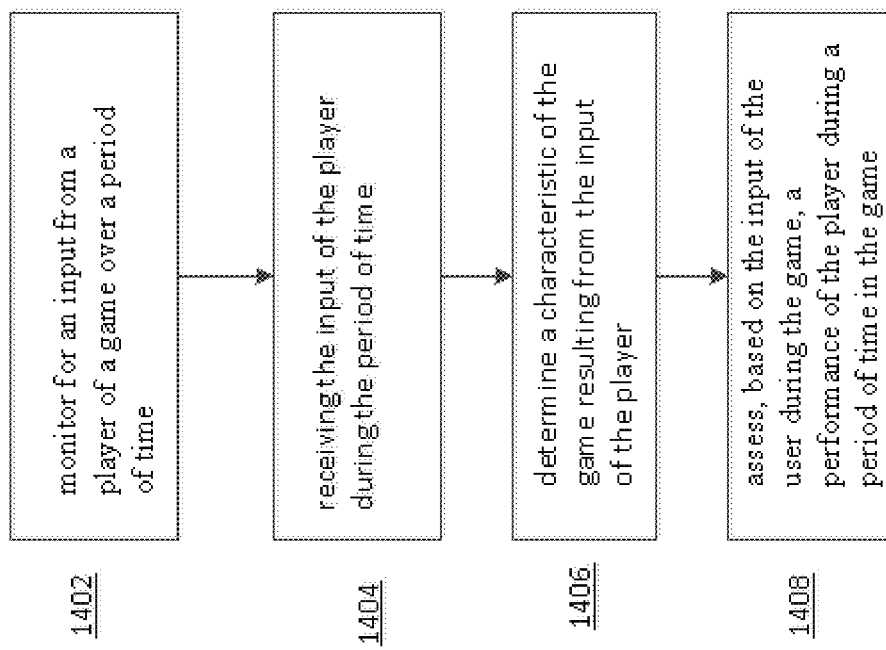
FIG. 14 illustrates a process for assessing performance of a player of a game, according to some embodiments.

Referring to FIG. 14, an exemplary process for assessing a performance of a player of a game is illustrated. Beginning at step 1402, an input from the player of the game can be received. Next, at step 1404, a characteristic of the game resulting from the input from the player can be determined. Subsequently, at step 1406, the input from the player during the game can be monitored. Thereafter, at step 1408, based on the input from the player during the game, a performance of the player during a period of time in the game can be assessed. The performance of the player can be related to one or more metrics of the game. Moreover, the performance of the player can comprise comparing the input from the player during a period of time in the game to an optimal input from the player during the period of time in the game.

According to another embodiment, a method for sensorimotor assessment is provided, comprising: (i) receiving information about at least one persons' movements when interacting with a virtual environment; and (ii) monitoring at least one of the persons' movements to assess the persons' performance interacting with the virtual environment, wherein performance comprises at least one of speed and accuracy of movement. The method can further comprise: (i) applying at least one of pattern recognition, pattern classification, and machine learning operations to analyze performance assessment of the plurality of persons; and (ii) comparing the performance assessment of an individual player with that of the plurality of players.

The performance assessment further comprises at least one of speed, precision, accuracy, reaction time, a speed-accuracy tradeoff, spatial bias, movement gain, gain variability, lapse rate, consistency, efficiency, tracking accuracy, flick accuracy, visual acuity, visual-detection reaction time, auditory spatial localization accuracy, change detection accuracy, decision accuracy, rate of adaptation, attention, cognitive control to ignore distractors, cognitive capacity, accuracy in decisions about whether or not to execute a movement, decision-making abilities, memory, learning rate, a relative value of a series of movements, kills per sec, time per kill, kill-death ratio, damage dealt, damage accrued, damage blocked, time spent on objective, kills or deaths by objective, critical damage, healing dealt, healing accrued, assists, and final blows.

The method can further comprise presenting distracting sensory stimulation to at least one of the persons.

The method can further comprise a service to help players choose teammates, to automatically select teammates, or to help eSports teams and coaches identify and recruit talented players, based the performance assessments of at least one of the persons. The service can be at least one of a website, a mobile app, an in-game overlay, or a social network.

According to another embodiment, a method for sensorimotor training is provided, comprising: (i) presenting sensory stimulation to at least one person, wherein the sensory stimulation comprises at least one of visual, auditory, or somatosensory stimulation, and wherein the sensory stimulation is rendered to correspond to a virtual environment; (ii) receiving information about at least one of the persons' movements when interacting with the virtual environment; (iii) monitoring the movements to assess at least one of the persons' performance interacting with the virtual environment, wherein performance comprises at least one of speed and accuracy of movement; and (iv) manipulating the sensory stimulation presented to at least one of persons based on the assessment of their performance, wherein the manipulation of sensory stimulation is designed to improve the persons' performance.

The manipulation of the sensory stimulation further comprises at least one of placing target stimuli at locations where at least one of the player's performance is slow, placing target stimuli at locations where at least one of the persons' performance is inaccurate, changing the contrast of at least one target stimulus, changing the transparency of at least one target stimulus, changing the size of at least one target stimulus, changing the timing of presentation of at least one target stimulus, changing the presentation duration of at least one target stimulus, changing the color of at least one target stimulus, changing the shape of at least one target stimulus, changing the texture of at least one target stimulus, changing the temporal frequency of at least one target stimulus, changing the speed of motion of at least one target stimulus, and changing the direction of motion of at least one target stimulus.

The improved performance further comprises at least one of making faster movements, making more accurate movements, making more precise movements, making movements with a shorter reaction time, making movements that correspond to a better speed-accuracy tradeoff curve, making movements that correspond to a better tradeoff between speed and accuracy, making a more valuable series of movements versus alternative less valuable movements, faster visual-detection reaction time, more accurate auditory spatial-location, more accurate change detection, better accuracy in decisions about whether or not to execute a movement, more accurate movement gain, less gain variability, less spatial bias, more kills per sec, less time per kill, lower lapse rate, more accurate tracking, greater consistency, better flick accuracy, greater efficiency, better decision-making abilities in flexible contexts, better visual acuity, better memory, faster learning rate, better cognitive control to ignore distractors, faster rate of adaptation, higher kill-death ratio, more damage dealt, less damage accrued, more damage blocked, less time spent on objective, more kills or less deaths by objective, more critical damage, more healing dealt, better healing accrued, more assists, and more final blows.

According to another embodiment, a method for sensorimotor training is provided, comprising: (i) receiving information about at least one persons' movements when interacting with a virtual environment; (ii) monitoring the movements to assess at least one of the persons' performance interacting with the virtual environment, wherein performance comprises at least one of speed and accuracy of movement; and (iv) providing feedback to at least one of the persons about the assessment of their performance, wherein the feedback comprises at least one of visual, auditory, or somatosensory stimulation, and wherein the feedback is designed to improve the persons' performance.

The feedback further comprises at least one of indicating the speed of at least one of the persons' movements, and indicating the accuracy of at least one of the persons' movements. The feedback can also comprise presenting at least one target, removing at least one of the targets when at least one of the players' initiate movements, and re-presenting at least one of the targets after at least one of the players complete at least one movement. The feedback can also comprise explosive feedback indicating whether or not a target was hit, and where the target was hit. The feedback can also comprise a change in the color of a cursor or crosshairs indicating whether or not a target was hit, and whether or not a movement was correct or accurate. The feedback can also comprise auditory tones or sounds or somatosensory stimulation presented during or immediately following a player's movements. The feedback can also comprise a visual representation summarizing a player's performance over a period of time.

According to another embodiment, a method for training sensorimotor performance is provided, comprising: (i) presenting sensory stimulation to at least one person, wherein the sensory stimulation comprises at least one of visual, auditory, or somatosensory stimulation, and wherein the sensory stimulation is rendered to correspond to a virtual environment; (ii) presenting distracting sensory stimulation to at least one of the persons, wherein the distracting sensory stimulation comprises at least one of visual, auditory, or somatosensory stimulation; (iii) receiving information about at least one of the persons' movements when interacting with the virtual environment; (iv) monitoring the movements to assess at least one of the persons' performance interacting with the virtual environment, wherein performance comprises at least one of speed and accuracy of movement; and (v) manipulating the distracting sensory stimulation presented to at least one of the persons based on the assessment of their performance, wherein the manipulation of the distracting sensory stimulation is designed to improve the persons' performance.

The manipulation of the distracting sensory stimulation further comprises at least one of changing the distance between distractor stimuli and target stimuli, changing the time between presentation of distractor stimuli and target stimuli, changing the stimulus-onset-asynchrony between distractor stimuli and target stimuli, changing the presentation duration of at least one distractor stimulus, changing the contrast of at least one distractor stimulus, changing the transparency of at least one distractor stimulus, changing the size of at least one distractor stimulus, changing the color of at least one distractor stimulus, changing the shape of at least one distractor stimulus, changing the texture of at least one distractor stimulus, changing the temporal frequency of at least one distractor stimulus, changing the speed of motion of at least one distractor stimulus, changing the direction of motion of at least one distractor stimulus, changing the relative velocity between at least one distractor stimulus and at least one target stimulus. The distractor stimuli can also comprise auditory tones or sounds or somatosensory stimulation.

According to another embodiment, a method for sensorimotor training is provided, comprising: (i) receiving information about at least one persons' movements when interacting with a virtual environment; (ii) monitoring the movements to assess at least one of the persons' performance interacting with the virtual environment; and (iii) manipulating the relationship between at least one of the persons' movements and their interaction with the virtual environment, wherein the manipulation is designed to improve the persons' performance. The performance can comprise at least one of speed and accuracy.

The manipulation of the relationship between the persons' movements and their interaction with the virtual environment further comprises manipulating at least one of position, velocity, acceleration, higher-order temporal derivatives of the position, orientation, angular velocity, angular acceleration, higher-order temporal derivatives of orientation, joint angle, angular velocity of joint angle, angular acceleration of joint angle, and higher-order temporal derivatives of joint angle.

According to another embodiment, a method for sensorimotor assessment is provided, comprising: (i) presenting sensory stimulation to a plurality of persons, wherein the sensory stimulation comprises at least one of visual, auditory, or somatosensory stimulation, and wherein the sensory stimulation is rendered to correspond to a virtual environment; (ii) receiving information about at least one of the persons' movements when interacting with the virtual environment; (iii) monitoring the movements to assess each person's performance interacting with the virtual environment, wherein performance comprises at least one of speed and accuracy of movement; (iv) applying at least one of pattern recognition, pattern classification, and machine learning operations to analyze performance assessment of the plurality of persons; and (v) comparing the performance assessment of an individual player with that of the plurality of players.

The pattern recognition, pattern classification, and machine learning operations further comprise at least one of correlation, canonical correlation, sum of squared difference, least-squares, partial least squares, nearest neighbor, Mahalanobis distance, regression, multiple linear regression, logistic regression, polynomial regression, general linear model, principal components analysis (PCA), singular value decomposition (SVD), factor analysis, principal components regression, independent components analysis (ICA), multidimensional scaling, dimensionality reduction, maximum likelihood classifier, maximum a posteriori classifier, Bayesian classifier, Bayesian decision rule, radial basis functions, linear discriminant analysis, regularized discriminant analysis, general linear discriminant analysis, flexible discriminant analysis, penalized discriminant analysis, mixture discriminant analysis, Fischer linear discriminant, regularization, density estimation, naive Bayes classifier, mixture model, Gaussian mixtures, minimum description length, cross-validation, bootstrap methods, EM algorithm, Markov chain Monte Carlo (MCMC) methods, regression trees, classification trees, boosting, AdaBoost, gradient boosting, neural network classifier, projection pursuit, projection pursuit regression, support vector machine, support vector classifier, K-means clustering, vector quantization, k-nearest-neighbor classifier, adaptive nearest-neighbor classifier, cluster analysis, clustering algorithms, k-medoids, hierarchical clustering, sparse principal components, non-negative matrix factorization, nonlinear dimension reduction, undirected graph models, statistical learning, supervised learning, and unsupervised learning.

According to another embodiment, a method for sensorimotor assessment is provided, comprising: (i) determining the state of a virtual environment by reading from computer memory; (ii) receiving information about at least one persons' movements when interacting with the virtual environment; and (iii) monitoring the movements to assess each person's performance interacting with the virtual environment, wherein performance comprises at least one of speed and accuracy of movement.

According to another embodiment, a system for sensorimotor assessment is provided, comprising: a computer program configured to present sensory stimulation to at least one person. The sensory stimulation comprises at least one of visual, auditory, or somatosensory stimulation, and is rendered to correspond to a virtual environment. The computer program receives input from at least one input controller configured to provide input signals to the computer program that allow at least one of the persons to interact with the virtual environment. The computer program changes the state of the virtual environment based on the input signals, and the computer program re-renders the sensory stimulation according to the changes of state of the virtual environment. The computer program is further configured to evaluate the input signals to assess at least one of the persons' performance interacting with the virtual environment, wherein performance comprises at least one of speed and accuracy of movement.

According to another embodiment, a system for sensorimotor training is provided, comprising: (i) a computer program configured to present sensory stimulation to at least one person, wherein the sensory stimulation comprises at least one of visual, auditory, or somatosensory stimulation, and wherein the sensory stimulation is rendered to correspond to a virtual environment; and (ii) at least one input controller configured to provide input signals to the computer program that allow at least one of the persons to interact with the virtual environment. The computer program is also configured to: (i) change the state of the virtual environment based on the input signals; (ii) re-render the sensory stimulation according to the changes of state of the virtual environment; (iii) evaluate the input signals to assess at least one of the persons' performance interacting with the virtual environment, wherein performance comprises at least one of speed and accuracy of movement; and (iv) manipulate the sensory stimulation presented to at least one of the persons based on the assessment of their performance, wherein the manipulation of sensory stimulation is designed to improve the persons' performance.

According to another embodiment, a system for sensorimotor training is provided, comprising: (i) a computer program configured to present sensory stimulation to at least one person, wherein the sensory stimulation comprises at least one of visual, auditory, or somatosensory stimulation, and wherein the sensory stimulation is rendered to correspond to a virtual environment; and (ii) at least one input controller configured to provide input signals to the computer program that allow at least one of the persons to interact with the virtual environment, wherein the computer program changes the state of the virtual environment based on the input signals, and the computer program re-renders the sensory stimulation according to the changes of state of the virtual environment. The computer program is also configured to: (i) evaluate the input signals to assess at least one of the persons' performance interacting with the virtual environment, wherein performance comprises at least one of speed and accuracy of movement; and (ii) provide feedback to at least one of the persons about the assessment of their performance, wherein the feedback comprises at least one of visual, auditory, or somatosensory stimulation, and wherein the feedback is designed to improve the persons' performance.

According to another embodiment, a system for training sensorimotor performance is provided, comprising: (i) a computer program configured to present sensory stimulation and distracting sensory stimulation to at least one person, wherein the sensory stimulation comprises at least one of visual, auditory, or somatosensory stimulation, wherein the sensory stimulation is rendered to correspond to a virtual environment, wherein the distracting sensory stimulation comprises at least one of visual, auditory, or somatosensory stimulation; and (ii) at least one input controller, configured to provide input signals to the computer program that allow at least one of the persons to interact with the virtual environment. The computer program is configured to: (i) change the state of the virtual environment based on the input signals; (ii) re-renders the sensory stimulation according to the changes of state of the virtual environment; (iii) evaluate the input signals to assess at least one of the persons' performance interacting with the virtual environment, wherein performance comprises at least one of speed and accuracy of movement; and (iv) manipulate the distracting sensory stimulation presented to at least one of the persons based on the assessment of their performance, wherein the manipulation of distracting sensory stimulation is designed to improve the persons' performance.

According to another embodiment, a system for sensorimotor training is provided, comprising: (i) a computer program configured to present sensory stimulation to at least one person, wherein the sensory stimulation comprises at least one of visual, auditory, or somatosensory stimulation, and wherein the sensory stimulation is rendered to correspond to a virtual environment; and (ii) at least one input controller configured to provide input signals to the computer program that allow at least one of the persons to interact with the virtual environment. The computer program is configured to: (i) change the state of the virtual environment based on the input signals, and the computer program re-renders the sensory stimulation according to the changes of state of the virtual environment; (ii) evaluate the input signals to assess at least one of the persons' performance interacting with the virtual environment, wherein performance comprises at least one of speed and accuracy of movement; and (iii) manipulate the relationship between at least one of the persons' movements and their interaction with the virtual environment, wherein the manipulation is designed to improve the persons' performance.

According to another embodiment, a system for sensorimotor assessment is provided, comprising: (i) a computer program configured to present sensory stimulation to at least one person, wherein the sensory stimulation comprises at least one of visual, auditory, or somatosensory stimulation, and wherein the sensory stimulation is rendered to correspond to a virtual environment; and (ii) at least one input controller, configured to provide input signals to the computer program that allow at least one of the persons to interact with the virtual environment. The computer program is also configured to: (i) change the state of the virtual environment based on the input signals; (ii) re-render the sensory stimulation according to the changes of state of the virtual environment; (iii) evaluate the input signals to assess at least one of the persons' performance interacting with the virtual environment, wherein performance comprises at least one of speed and accuracy of movement; (iv) apply at least one of pattern recognition, pattern classification, and machine learning operations to analyze performance assessment of the plurality of persons; and (v) compare the performance assessment of an individual player with that of the plurality of players.

According to another embodiment, a system for detecting cheating in video games and eSports is provided, comprising: (i) a computer program; and (ii) at least one input controller, configured to provide input signals to the computer program. The computer program is also configured to: (i) evaluate the input signals to assess at least one persons' performance interacting with a virtual environment, wherein performance comprises at least one of speed and accuracy of movement; (ii) apply at least one of pattern recognition, pattern classification, and machine learning operations to analyze performance assessment of the plurality of persons; and (iii) compare the performance assessment of an individual player with that of the plurality of players.

According to another embodiment, a system for sensorimotor assessment is provided, comprising: (i) a computer program; and (ii) at least one input controller, configured to provide input signals to the computer program. The computer program is also configured to: (i) determine the state of a virtual environment by reading from computer memory; and (ii) evaluate the input signals to assess at least one persons' performance interacting with the virtual environment, wherein performance comprises at least one of speed and accuracy of movement.

According to another embodiment, a system for improving sensorimotor performance is provided, comprising: (i) a computer program configured to present sensory stimulation to at least one person, wherein the sensory stimulation comprises at least one of visual, auditory, or somatosensory stimulation, and wherein the sensory stimulation is rendered to correspond to a virtual environment; and (ii) at least one input controller configured to provide input signals to the computer program that allow at least one of the persons to interact with the virtual environment. The computer program is configured to: (i) change the state of the virtual environment based on the input signals, (ii) re-render the sensory stimulation according to the changes of state of the virtual environment; (iii) evaluate the input signals to assess at least one of the persons' movements interacting with the virtual environment; and (iv) manipulate the evaluation of the input signals to correct for systematic biases in the persons' movements.

Figure 15:
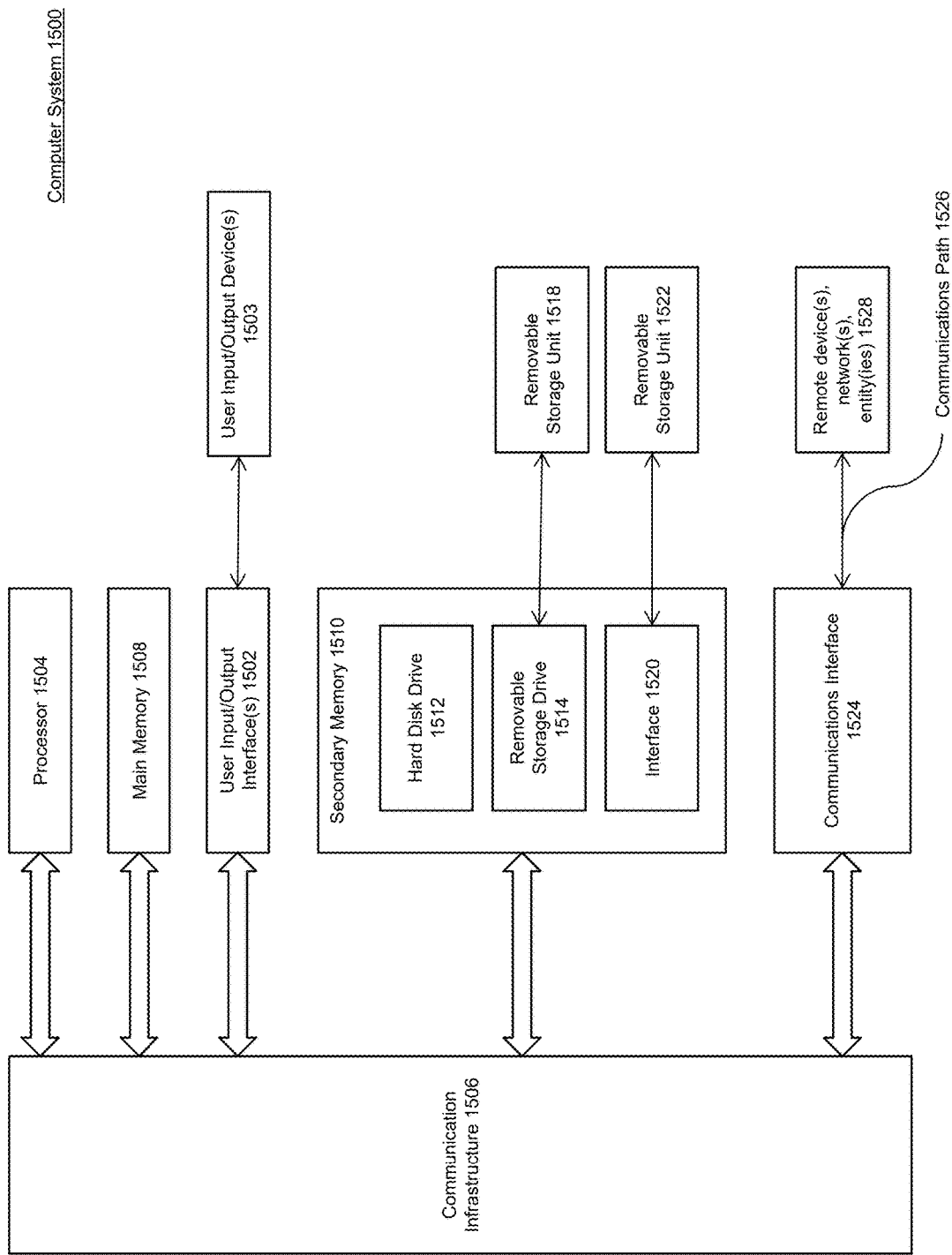
FIG. 15 illustrates an example computer system useful for implementing various embodiments.

Various embodiments can be implemented, for example, using one or more well-known computer systems, such as computer system 1500 shown in FIG. 15. Computer system 1500 can be any well-known computer capable of performing the functions described herein.

Computer system 1500 includes one or more processors (also called central processing units, or CPUs), such as a processor 1504. Processor 1504 is connected to a communication infrastructure or bus 1506.

One or more processors 1504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1500 also includes player input/output device(s) 1503, such as monitors, keyboards, pointing devices, etc., that communicate with communication infrastructure 1506 through player input/output interface(s) 1502.

Computer system 1500 also includes a main or primary memory 1508, such as random access memory (RAM). Main memory 1508 may include one or more levels of cache. Main memory 1508 has stored therein control logic (i.e., computer software) and/or data.

Computer system 1500 may also include one or more secondary storage devices or memory 1510. Secondary memory 1510 may include, for example, a hard disk drive 1512 and/or a removable storage device or drive 1514. Removable storage drive 1514 may be a floppy disk drive, a magnetic tape drive, a compact disk drive, an optical storage device, tape backup device, and/or any other storage device/drive.

Removable storage drive 1514 may interact with a removable storage unit 1518. Removable storage unit 1518 includes a computer usable or readable storage device having stored thereon computer software (control logic) and/or data. Removable storage unit 1518 may be a floppy disk, magnetic tape, compact disk, DVD, optical storage disk, and/any other computer data storage device. Removable storage drive 1514 reads from and/or writes to removable storage unit 1518 in a well-known manner.

According to an exemplary embodiment, secondary memory 1510 may include other means, instrumentalities or other approaches for allowing computer programs and/or other instructions and/or data to be accessed by computer system 1500. Such means, instrumentalities or other approaches may include, for example, a removable storage unit 1522 and an interface 1520. Examples of the removable storage unit 1522 and the interface 1520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1500 may further include a communication or network interface 1524. Communication interface 1524 enables computer system 1500 to communicate and interact with any combination of remote devices, remote networks, remote entities, etc. (individually and collectively referenced by reference number 1528). For example, communication interface 1524 may allow computer system 1500 to communicate with remote devices 1528 over communications path 1526, which may be wired and/or wireless, and which may include any combination of LANs, WANs, the Internet, etc. Control logic and/or data may be transmitted to and from computer system 1500 via communication path 1526.

At least some of the above embodiments are capable of providing some of the assessment and training capabilities described in this disclosure. The above embodiments have been tested and used by over 150,000 eSports players. In some embodiments, a system includes a Windows 10 PC with an NVIDIA GTX 1060 graphics card, 21" computer monitor, and mouse and keyboard input devices. The software was written in the C# programming language using the Unity game engine. The Unity game engine is a cross-platform video game engine developed by Unity Technologies that is used for developing video games and simulations for computers, mobile devices, and gaming consoles. A person of ordinary skill in the art would recognize that the interface hardware and software could be varied depending on the type of game skills and games for which training is being provided. In some embodiments, a player's performance is assessed, including shooting speed, shooting precision, shooting accuracy, shooting reaction time, along with other assessment metrics as disclosed above. A person of skill in the art would recognize that a variety of other gaming skills may be the subject of assessment and training as well.

In an embodiment, a tangible apparatus or article of manufacture comprising a tangible computer useable or readable medium having control logic (software) stored thereon is also referred to herein as a computer program product or program storage device. This includes, but is not limited to, computer system 1500, main memory 1508, secondary memory 1510, and removable storage units 1518 and 1522, as well as tangible articles of manufacture embodying any combination of the foregoing. Such control logic, when executed by one or more data processing devices (such as computer system 1500), causes such data processing devices to operate as described herein.

Based on the teachings contained in this disclosure, it will be apparent to persons skilled in the relevant art(s) how to make and use embodiments using data processing devices, computer systems and/or computer architectures other than that shown in FIG. 15. In particular, embodiments may operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for sensorimotor training used by a player of a game, the method comprising:
    monitoring, by at least one computer processor, inputs in a game by a player using a computer input device, the inputs comprising movements and shots;
    determining a metric of the inputs, wherein the metric comprises at least one of: a distance between a projectile and a center of a target; and a distance between a movement and the center of a target; and
    adjusting, by the at least one processor, a relationship between an input received via the computer input device and the movement of a virtual object within the virtual environment of the game based on the metric to train the player to adjust the player's movements of the input device.

2. The method of claim 1, wherein the computer input device comprises a device selected from the group consisting of: a mouse; a joystick; an accelerometer; a pointing device; a motion capture device; a Wii remote controller; an eye tracker; and a computer vision system.

3. The method of claim 1, wherein the relationship is the sensitivity of the computer input device.

4. The method of claim 1, comprising setting the sensitivity of the computer input device.

5. The method of claim 1, wherein the metric comprises the distance between a movement and the center of a target, and the metric is computed based on a statistical analysis of the movement error for a plurality of movements.

6. The method of claim 1, wherein determining the metric comprises fitting a statistical model to a distribution of errors.

7. The method of claim 1, wherein the metric comprises at least one of the group consisting of: precision, variability and accuracy.

8. The method of claim 1, wherein the metric is a performance metric of movement trajectories.

9. A device for sensorimotor training used by a player of a game, the device comprising:
    a memory; and
    a processor to:
        monitor inputs in a game by a player using a computer input device, the inputs comprising movements and shots;
        determine a metric of the inputs, wherein the metric comprises at least one of: a distance between a projectile and a center of a target; and a distance between a movement and the center of a target; and
        adjust a relationship between an input received via the computer input device and the movement of a virtual object within the virtual environment of the game based on the metric to train the player to adjust the player's movements of the input device.

10. The device of claim 9, wherein the computer input device comprises a device selected from the group consisting of: a mouse; a joystick; an accelerometer; a pointing device; a motion capture device; a Wii remote controller; an eye tracker; and a computer vision system.

11. The device of claim 9, wherein the relationship is the sensitivity of the computer input device.

12. The device of claim 9, wherein the processor is to set the sensitivity of the computer input device.

13. The device of claim 9, wherein the metric comprises the distance between a movement and the center of a target, and the metric is computed based on a statistical analysis of the movement error for a plurality of movements.

14. The device of claim 9, wherein determining the metric comprises fitting a statistical model to a distribution of errors.

15. The device of claim 9, wherein the metric comprises at least one of the group consisting of: precision, variability and accuracy.

16. A computer-implemented method for sensorimotor training in a virtual environment, the method comprising, using a computer processor:
    determining a metric of inputs to the virtual environment by a user using a computer input device, wherein the metric comprises at least one of: a distance between a projectile and a center of a target; and a distance between a movement and the center of a target; and
    adjusting, by the at least one processor, a mapping between an input received via the computer input device and movement within the virtual environment based on the metric to train a player to adjust the player's movements of the computer input device.

17. The method of claim 16, wherein the computer input device comprises a device selected from the group consisting of: a mouse; a joystick; an accelerometer; a pointing device; a motion capture device; a Wii remote controller; an eye tracker; and a computer vision system.

18. The method of claim 16, comprising setting the sensitivity of the computer input device.

19. The method of claim 16, wherein the metric comprises the distance between a movement and the center of a target, and the metric is computed based on a statistical analysis of the movement error for a plurality of inputs.

20. The method of claim 16, wherein determining the metric comprises fitting a statistical model to a distribution of errors.

21. The method of claim 16, wherein the metric comprises at least one of the group consisting of: precision, variability and accuracy.

* * * * *